(12) United States Patent
Liao et al.

(10) Patent No.: US 11,508,149 B2
(45) Date of Patent: Nov. 22, 2022

(54) OPERATING METHOD WITH GOODS INFORMATION AND NON-TRANSITORY COMPUTER READABLE MEDIUM THEREOF

(71) Applicant: Novatek Microelectronics Corp., Hsinchu (TW)

(72) Inventors: Wen-Ching Liao, Hsinchu County (TW); Chao-Chi Yang, Hsinchu (TW); Wei-Te Hu, Hsinchu County (TW); Chi-Yuan Lai, Hsinchu County (TW); Kuan-Liang Kuo, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 73 days.

(21) Appl. No.: 16/892,251

(22) Filed: Jun. 3, 2020

(65) Prior Publication Data

US 2020/0387710 A1    Dec. 10, 2020

Related U.S. Application Data

(60) Provisional application No. 62/857,794, filed on Jun. 5, 2019.

(51) Int. Cl.
*G06V 20/20*     (2022.01)
*G06T 7/13*      (2017.01)
(Continued)

(52) U.S. Cl.
CPC ........... *G06V 20/20* (2022.01); *G06T 7/12* (2017.01); *G06T 7/13* (2017.01); *H04W 4/35* (2018.02)

(58) Field of Classification Search
CPC ............. G06K 9/00671; G06K 9/4609; G06K 9/4647; G06K 9/6218; G06K 9/2063; G06T 7/13; G06T 7/12; H04W 4/35
See application file for complete search history.

(56) References Cited

U.S. PATENT DOCUMENTS 9,857,799 B2    1/2018  Liu et al.
10,438,100 B1 *  10/2019 O'Hagan ............. G06K 15/024
(Continued)

FOREIGN PATENT DOCUMENTS

CN      104112216      10/2014
CN      106570510       4/2017
(Continued)

OTHER PUBLICATIONS

"Office Action of Taiwan Counterpart Application", dated Aug. 27, 2021, p. 1-p. 26.

*Primary Examiner* — Qian Yang
(74) *Attorney, Agent, or Firm* — JCIPRNET

(57) ABSTRACT

An operating method with goods information is applicable to an electronic device. The operation method includes: obtaining image information associated with one or more goods objects on a target electronic shelf among a plurality of electronic shelves in a network; and performing first communicating with a server for controlling the electronic shelves in the network according to either or both of the image information and feature information associated with the one or more goods objects, wherein feature information is extracted from the image information and the first communicating includes wirelessly transmitting either or both of the image information and the feature information associated with the one or more goods objects to the server.

52 Claims, 17 Drawing Sheets

(51) Int. Cl.
    *G06T 7/12*          (2017.01)
    *H04W 4/35*        (2018.01)

(56) References Cited

U.S. PATENT DOCUMENTS

| | | |
|---|---|---|
| 2013/0051667 A1 | 2/2013 | Deng et al. |
| 2015/0310601 A1 | 10/2015 | Rodriguez et al. |
| 2015/0332368 A1 | 11/2015 | Vartiainen et al. |
| 2017/0178226 A1 | 6/2017 | Graham et al. |
| 2017/0212520 A1 | 7/2017 | Liu et al. |
| 2018/0276603 A1 | 9/2018 | Lewis et al. |
| 2018/0300043 A1 | 10/2018 | Graham et al. |
| 2019/0213212 A1* | 7/2019 | Adato .................... G06F 16/55 |
| 2019/0215424 A1* | 7/2019 | Adato .................. G06F 16/583 |
| 2020/0279113 A1 | 9/2020 | Yanagi et al. |

FOREIGN PATENT DOCUMENTS

| | | |
|---|---|---|
| CN | 108846401 | 11/2018 |
| EP | 3388999 | 10/2018 |
| TW | 201433992 | 9/2014 |
| TW | 201727415 | 8/2017 |
| WO | 2015140851 | 9/2015 |
| WO | 2019057716 | 3/2019 |
| WO | 2019073063 | 4/2019 |
| WO | 2019087792 | 5/2019 |

\* cited by examiner

Please select correct item:

(1) Cookie C — 810

(2) Puff C — 820

(3) Cake B — 830

(4) Cake C — 840

(5) Cookie D — 850

Set empty

Scan barcode

800

OPERATING METHOD WITH GOODS INFORMATION AND NON-TRANSITORY COMPUTER READABLE MEDIUM THEREOF

CROSS-REFERENCE TO RELATED APPLICATION

This application claims the priority benefit of U.S. provisional application Ser. No. 62/857,794, filed on Jun. 5, 2019. The entirety of the above-mentioned patent applications is hereby incorporated by reference herein and made a part of this specification.

BACKGROUND

Field of the Invention

The invention relates to an operation method with goods information and a non-transitory computer readable medium thereof and more particularly, to the operation method applied on an electronic shelf.

Description of Related Art

In a conventional electronic shelves system, when images associated with one or more good objects on an electronic shelf have to be adjusted in occasions where physical positions of the goods items on the electronic shelf are changed or the goods items are replaced by different good items, an on-site staff cannot conveniently perform the adjustment. This is because the on-site staff needs to request an information staff to adjust the displayed content of the electronic shelf display through a back-end server.

However, even though the information staff is capable of operating the server to adjust the display contents, he does not know the actual positions of the goods items, having many troubles to perform adjustment process. Furthermore, when there are many electronic shelves exist, it is also problematic for the information staff to quickly adjust the displayed information for a corresponding electronic shelf.

SUMMARY

The invention provides a plurality of operation methods for communicating goods information between an electronic shelf and a backend server.

According to an embodiment of the invention, the operating method with goods information is applicable to an electronic device. The operation method includes: obtaining image information associated with one or more goods objects on at least one target electronic shelf among a plurality of electronic shelves in a network; and performing first communicating with a server for controlling the electronic shelves in the network according to either or both of the image information and feature information associated with the one or more goods objects, wherein the feature information is extracted from the image information, and the first communicating comprises wirelessly transmitting either or both of the image information and the feature information associated with the one or more goods objects to the server.

According to another embodiment of the invention, the operating method is applicable to a server for controlling a plurality of electronic shelves in a network, and includes: wirelessly receiving, from an electronic device, either or both of image information and feature information associated with a plurality of goods objects on at least one target electronic shelf among the electronic shelves; obtaining recognition information according to the feature information associated with the one or more goods objects; and, performing a display setting process for setting display information to be displayed by the at least one target electronic shelf according to the recognition information.

According to another embodiment of the invention, the operating method with goods information is executable by an electronic device, and includes: activating an image capturing process to obtain a captured image associated with one or more goods objects on a target electronic shelf among a plurality of electronic shelves in a network; and, displaying first display setting information for setting display information to be displayed by the target electronic shelf, wherein the first display setting information associated with the one or more goods objects comprises recognition information dependent upon feature information of the captured image.

According to another embodiment of the invention, the operating method with goods information is executable by an electronic device, and includes: activating an image capturing process to obtain a captured image associated with one or more goods objects on a target electronic shelf among a plurality of electronic shelves in a network; and, displaying first display setting information for setting display information to be displayed by the target electronic shelf, wherein the first display setting information associated with the one or more goods objects comprises recognition information dependent upon feature information of the captured image.

According to another embodiment of the invention, the non-transitory computer readable medium has stored thereon software instructions that when executed by a processor, causes the processor to execute to steps including: obtaining image feature information associated with one or more goods objects on at least one target electronic shelf among a plurality of electronic shelves in a network; and, wirelessly communicating with a server for controlling the electronic shelves in the network according to either or both of the image information and feature information associated with the one or more goods objects, wherein the communicating includes transmitting either or both of the image information and the feature information associated with the one or more goods objects to the server.

According to another embodiment of the invention, the non-transitory computer readable medium has stored thereon software instructions that when executed by a processor, causes the processor to execute to steps including: wirelessly receiving, from an electronic device, either or both of image information and feature information associated with a plurality of goods objects on at least one target electronic shelf among the electronic shelves; obtaining recognition information according to the feature information associated with the one or more goods objects; and, performing a display setting process for setting display information to be displayed by the target electronic shelf according to the recognition information.

To sum up, the operation method for communicating goods information can be performed between the at least one target electronic shelf and the server. The feature information associated with the goods on the at least one target electronic shelf can be generated by the server, or the feature information can be obtained by the electronic device and provided to the server through the network. The server can generate display setting information according to the feature information. Such as that, electronic shelf label (ESL) on at least one of the electronic shelves can be controlled more easily, and manpower can be largely saved.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
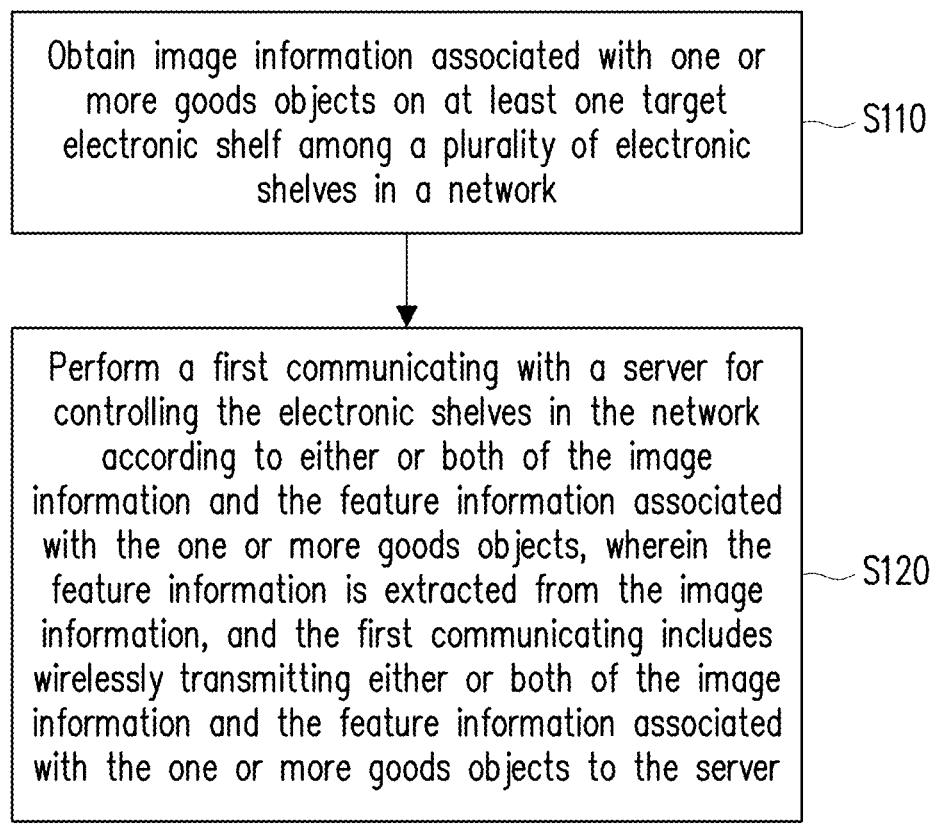
FIGS. 1A-1D are a plurality of flow charts of operating methods with goods information according to a plurality of embodiments of present disclosure.

The term "couple (or connect)" throughout the specification (including the claims) of this application are used broadly and encompass direct and indirect connection or coupling means. For instance, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. In addition, terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

In some embodiments, an operating method is disclosed, which can combine image processing and object recognition techniques. Accordingly, a user (e.g., on site working staff) of an electronic device such as a mobile phone can more easily update the contents and/or positions of electronic shelf labels.

In some embodiments, an APP can be executed by an electronic device such as a mobile phone to perform the operating method.

In some embodiments, image information can be obtained by capturing images of one or more goods objects on at least one target electronic shelfs. Feature information can be extracted by either the electronic information or a server capable communicating with the electronic device based on the image information. The image information and/or the feature information can be sent to the server via a network, wirelessly or non-wirelessly. Any communication method or network can be utilized. The server can then recognize the one or more objects, obtain and send related information associated with the one or more objects to the at least one electronic shelfs to update displayed contents of the electronic shelf labels or the electronic shelf displays.

In some embodiments, according to a recognition result for one or more goods objects on at least one target electronic shelf, advertisement information can also be obtained and sent by the server to the at least one target electronic shelfs such that advertisement can be displayed at appropriate positions on the at least one target electronic shelfs.

Please refer to FIG. 1A, which is a flow chart of an operating method with goods information according to an embodiment of present disclosure. The operating method is applicable to an electronic device. The goods information is associated with one or more goods objects on at least one target electronic shelf, which is among a plurality of electronic shelves. The electronic shelves can be wirelessly or non-wirelessly connected to a network to which a server can be also wirelessly or non-wirelessly connected thereto. Each of the electronic shelve can have a shelf display for displaying an electronic shelf label. Communication between the electronic device and server about information associated with the one or more goods objects on at least one target electronic shelf can enable the server to set display information to be displayed by the shelf display of the at least one target electronic shelf, via communication between the server and the at least one target electronic shelf.

In a step S110, image information associated with the one or more goods objects on the at least one target electronic shelf among the plurality of electronic shelves can be obtained by the electronic device. In some implementations, feature information associated with the one or more goods objects on the at least one target electronic shelf among a plurality of electronic shelves can be further obtained by the electronic device, for example, by performing extracting process based on the image information. In other words, the electronic device can obtain any types of information related to one or more images of the one or more goods objects on the at least one target electronic shelf. The electronic device may be a mobile phone, or any other hand-held electronic device well known in this art, or any convenient device, capable of obtaining the necessary information (for example, the image information) and communicating with the server. The operating method may be performed as an APP or any types of software executed on the electronic device.

After either or both of the image information and the feature information is obtained by the electronic device, a step S120 can be performed. In this step, the electronic device 220 can communicate with the server using only the image information, only the feature information, or both the image information and the feature information. In other words, the electronic device can communicate with the server using any types of information related to one or more images of the one or more goods objects on the at least one target electronic shelf. As such, the server can communicate with the at least one target electronic shelf to set the display information to be displayed by the at least one target electronic shelf based on the information received from the electronic device. The display information may include at least one of name information, price information, and advertisement information.

More specifically, in the step S120, the electronic device can perform a first communicating with the server for controlling the electronic shelves in the network according to either or both of the image information and the feature information associated to the one or more goods objects. The first communicating includes wirelessly transmitting either or both of the image information and the feature information associated with the one or more goods objects to the server.

In present embodiment, the server may be a far-end server, and the electronic device can wirelessly transmit the either or both of the image information and the feature information associated to the one or more goods objects to the server. In a first embodiment, the electronic device may perform image processing on the image information of the captured image associated to the one or more goods objects to obtain the feature information, and transmit the feature information to the server. In a second embodiment, the electronic device may transmit the image information to the server without performing the image processing in advance, and the image processing is performed in the server according to the image information to obtain the feature information.

Figure 1B:
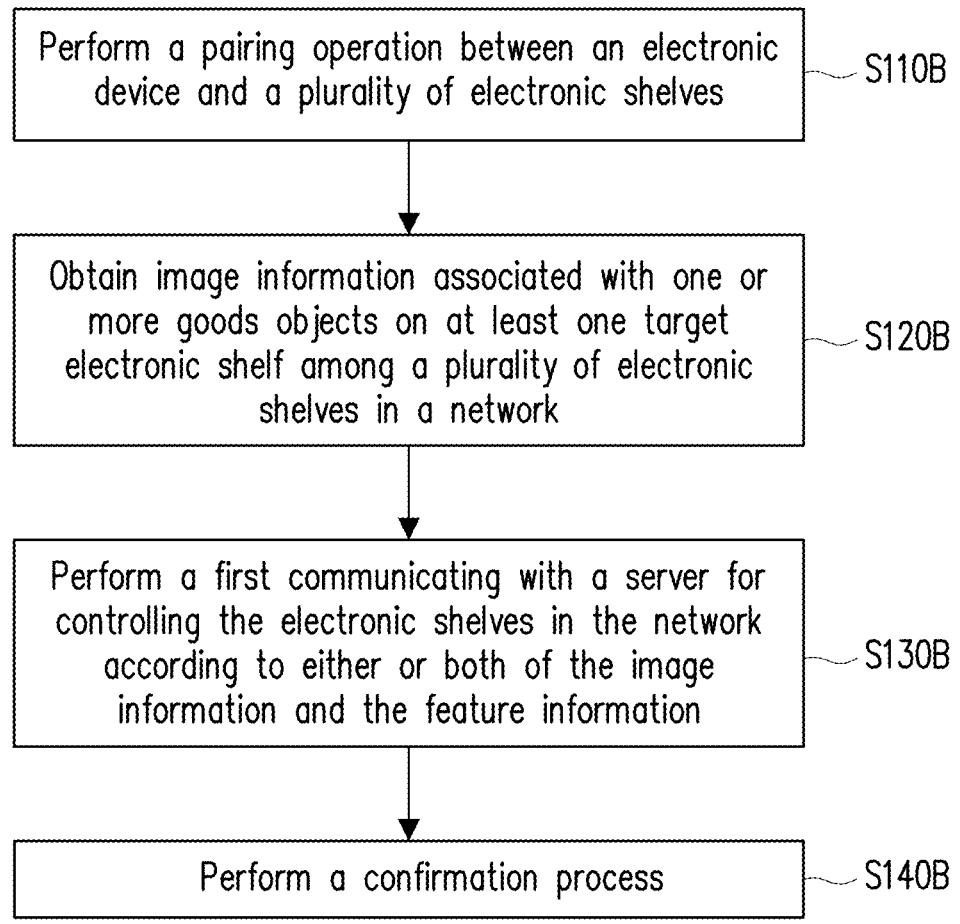

In present embodiment, prior to step S110, the electronic device can firstly perform a pairing operation on the plurality of electronic shelves. Refer to FIG. 1B, which is a flow chart of an operating method according to another embodiment of present disclosure. In FIG. 1B, a step S110B is used to perform a pairing operation between an electronic device and a plurality of electronic shelves. During the pairing operation, at least one of the electronic shelves may be selected or identified by the electronic device, from all of a plurality of electronic shelves, which have been registered to a same network. The selected or identified at least one electronic shelve can then serve as at least one target electronic shelf whose displayed contents is to be adjusted. Various methods can be used to select at least one electronic shelf from the electronic shelves of the network to be the target electronic shelf to undergo display information modification. For example, NFC sensing, code scanning, and physical keying may be used. In an implementation, the pairing can be performed by the electronic device by capturing one or more images of the target electronic shelf. An identification information of the target electronic shelf can be obtained by the electronic device according to the at least one captured image of the target electronic shelf. The image may be a code image, for example, a QR code image, which may be displayed only during the pairing process. Alternatively, the electronic device may further perform an image analysis on the captured image to obtain the identification information. In other words, the identification information may be QR code or any other feature information obtained based on the captured image. Further, the electronic device can communicate with the server according to the identification information of the target electronic shelf, and the server can search the electronic shelves registered to the network for the target electronic shelf according to the identification information received from the electronic device.

It is noted that, in some implementations, the server is configured to receive the image information from the electronic device and obtain the identification information based on the received information. In some other implementations, the server is configured to receive the identification information from the electronic device. In other words, any information can be utilized and provided by the electronic device to the server to enable the server to search for the target electronic shelf.

In a step S120B, which is similar to step S110 of FIG. 1A, the electronic device may be configured to obtain image information representing feature information associated with one or more goods objects on the target electronic shelf among the electronic shelves in the network. The feature information can be obtained by an image processing operation on the image information associated with one or more goods objects on the at least one target electronic shelf. Details of the image processing operation will be described in the embodiments of FIGS. 4A, 4B and FIG. 5 and no more repeated description here.

In a step S130B, the electronic device may perform a first communicating with a server according to either or both of the image information and the feature information associated with one or more goods objects. The electronic device can wirelessly transmit either or both of the image information and the feature information to the server. The feature information can be obtained in the electronic device or the server by performing image processing operation. Accordingly, the server can identify the feature information to obtain recognition information of the goods objects according to the feature information. The server can generate a first display setting information according to the feature information to obtain recognition information, and transmit the first display setting information to the electronic device through a second communicating. The first display setting information may include identification information about the one or more goods on the at least one target electronic shelf obtained by the server.

Then, in a step S140B, the electronic device can perform a confirmation process in a step S140B for confirming whether the first display setting information is correct or not. The user may send a confirmation instruction through the electronic device to make sure the first display setting information is right.

As will be detailed in the following, if the confirmation result is positive, the flow can be finished, meaning the server can set the display information based on the confirmed identification information. Alternatively, if the confirmation result is positive, the flow can go to a further adjustment process which allows a user of the electronic device to further adjust display information such as position information. In contrast, if the confirmation result is negative, meaning that the user of the electronic device does not confirm the identification information associated with the one or more goods obtained by the server, a correction process can be performed to allow the user to correct the identification information.

Please be noted here, the pairing operation in the step S110B is not necessary in some embodiments of present disclosure. In some embodiments, the pairing operation in the step S110B may be skipped.

Figure 1C:
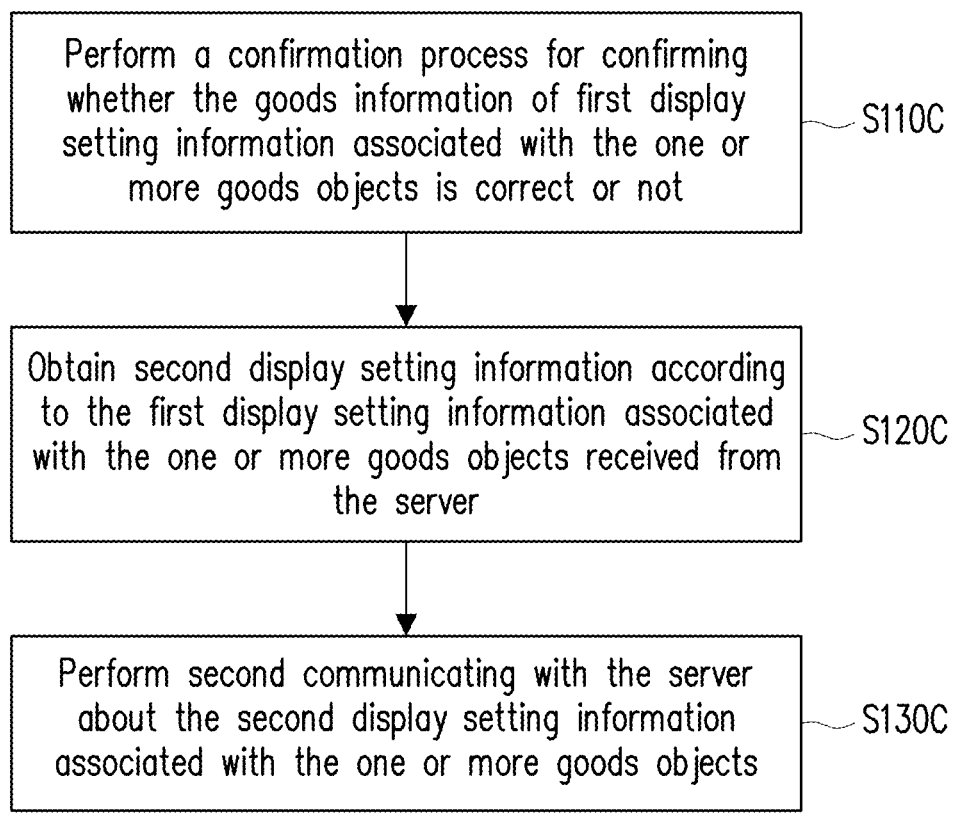

Please refer to FIG. 1C, which is a flow chart of an operating method according to another embodiment of present disclosure. Continued with the embodiment in FIG. 1B, in FIG. 1C, the electronic device may perform the confirmation process for confirming whether the goods information of first display setting information associated with the one or more goods objects is correct or not in a step S110C. The steps S120 and S130C may be performed after the confirmation process has a positive result (i.e., the goods information provided by the server is originally correct) or when the confirmation process has a positive result but a correction process has been performed to correct the goods information (i.e., the goods information provided by the server is originally incorrect but has been corrected by the electronic device). Steps S120C and S130C can achieve a manual adjustment by a user of the electronic device, leading to desired display effects of the electronic shelf labels or electronic shelf displays.

In some occasions, the user of the electronic device might think the first display setting information is not satisfying, so the user can provide the server, by using the electronic device, with desired display information to be displayed by the target electronic shelf. The dissatisfaction may occur due to distortion between the captured image and actual displayed on the electronic shelf. In other words, the electronic device may obtain second display setting information according to the first display setting information associated with the one or more goods objects received from the server in a step S120C.

In detail, the electronic device can provide the user with information about the first display setting information originally provided by the server, for example, images to be displayed according to the first display setting information. The user may check the first display setting information according to the information or the displayed image, and make a desired correction on the displayed image through a graphic user interface (GUI) provided by the electronic device. Such as that, the second display setting information can be obtained by the electronic device according to operations on the GUI. The second display setting information may be more desired or satisfying for the user.

Then, the electronic device may perform a second communicating with the server about the second display setting information associated with the one or more goods objects in a step S130C. Accordingly, the server can further obtain display information for setting the electronic shelf labels or electronic shelf display corresponding to the second display setting information more desired by the user.

In this embodiment, if the first display setting information is considered to be satisfying or desired in the step S120C, the step S130C can be skipped and the first display setting information can be used by the target electronic shelf for displaying accordingly.

Figure 1D:
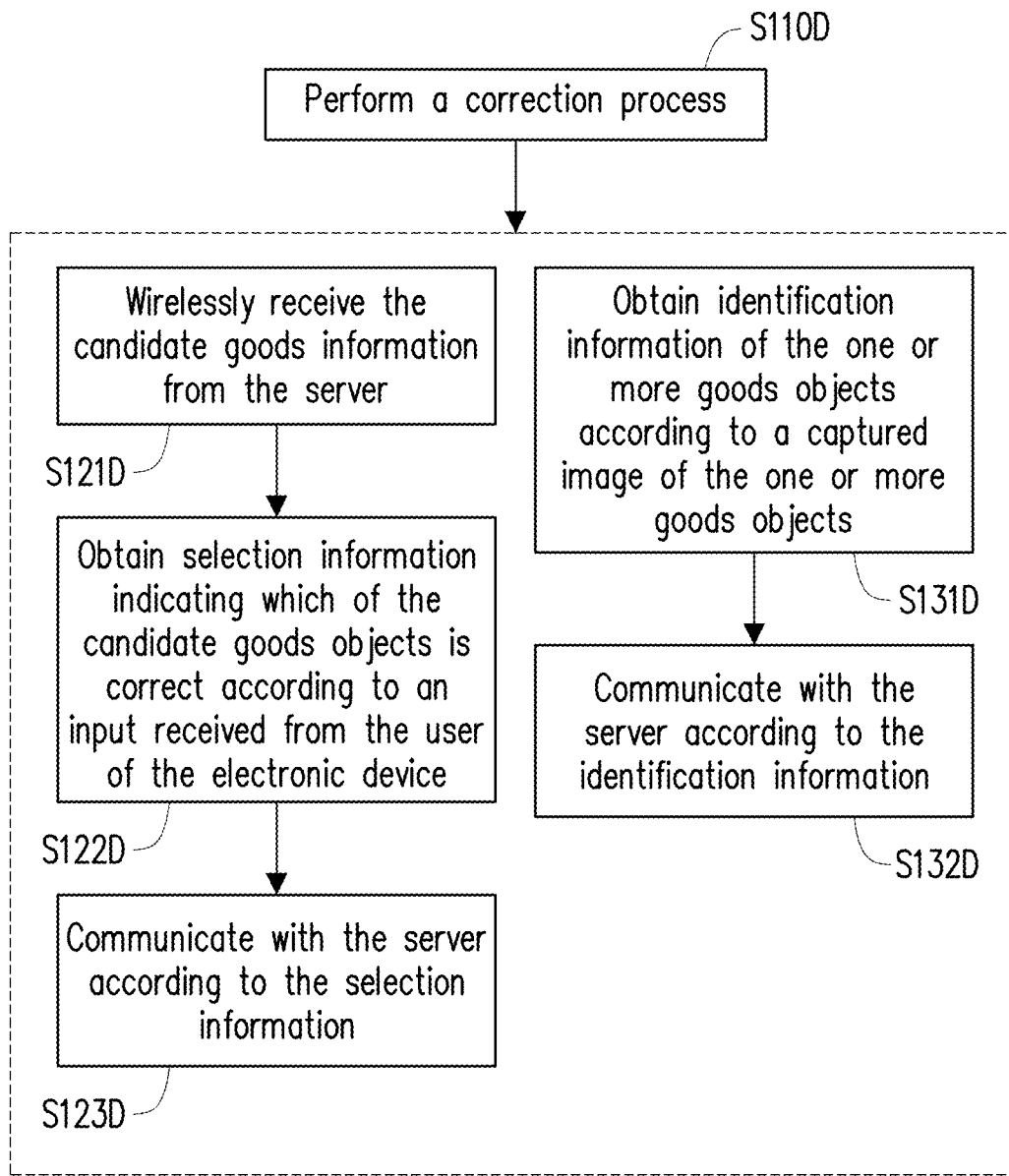

Please refer to FIG. 1D, which is a flow chart of an operating method according to another embodiment of present disclosure, showing a correction process. Goods information obtained by the server might not be correct, so the correction process can be performed after the confirmation process for confirming the goods information has a negative result. In this way, when a user of the electronic device finds that the goods information provided by the server is incorrect, the user can use the electronic device to provide the server with correct goods information so as to correct the goods information.

In other words, the correction process may be performed in appropriate occasions according to design requirements. For example, prior to the correction process, the electronic device may obtain confirmation result according to an input received from a user of the electronic device. If the confirmation process indicates there is any error in the goods information, the user can correct the goods information through the input to the electronic device. For example, in some implementations, the step S110D in FIG. 1D can be performed after the step S140B of FIG. 1B when the confirmation process has a negative result. The server can set the display information based on the correct goods information and the flow can be finished. In some other implementations, the step S110D in FIG. 1D can be performed after the step S110C of FIG. 1C when the confirmation process has a negative result. The flow can then go to the step S130C after the step S110D is completed, which allows the user to further adjust the display information to be displayed by the target electronic shelf.

In FIG. 1D, the electronic device may perform a correction process in the step S110D. FIG. 1D also shows details of the correction process according to an embodiment. In response to the input of the user, the electronic device may wirelessly receive candidate goods objects information from the server in a step S121D. The candidate goods objects information can be provided to the user from the server, and the electronic device may obtain selection information indicating which of the candidate goods objects is correct according to the input received from the user of the electronic device. This means that the electronic device can obtain the selection information according to the input of the user.

In a step S123D, the electronic device can communicate with the server according to the selection information. Accordingly, the server can further obtain display information corresponding to the correct goods information.

In the same or an alternative embodiment, for example, if S121D-S123D are removed, or the candidate goods objects information fails to provide a correct goods object for selection in step S122D, the electronic device may perform an image capturing operation on one or more goods object to obtain a captured image (in step S131D). The captured image may include identification information of the identified goods object. In some embodiment, the identification information can be a bar-code of the identified goods object. Such as that, the electronic device may obtain the identification information of the one or more objects goods according to the captured image of the one or more objects goods in a step S131D. Then, the electronic device may communicate with the server according to the identification information in a step S132D. Accordingly, the server can further obtain display information corresponding to the correct goods information.

Figure 2A:
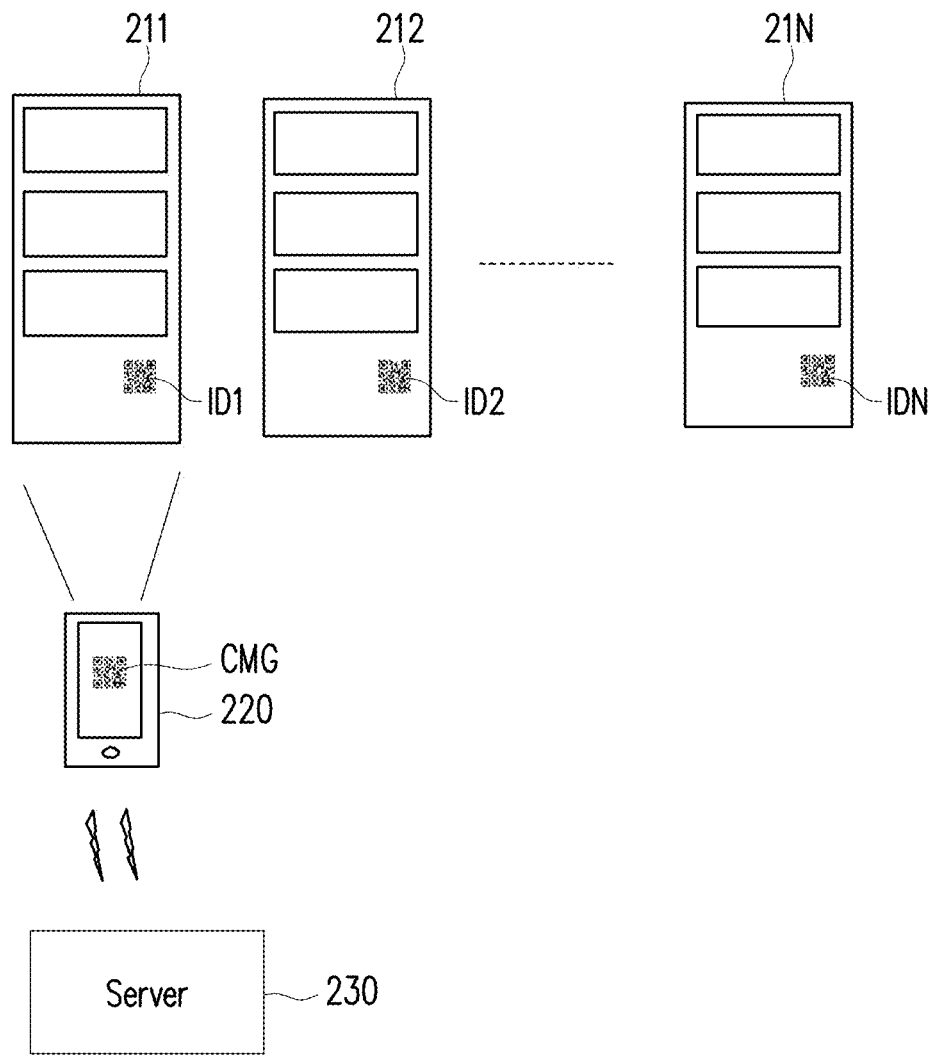
FIG. 2A illustrates a schematic plot of a pairing operation according to an embodiment of present disclosure.

Please refer to FIG. 2A, which illustrates a schematic plot of a pairing operation according to an embodiment of present disclosure. In FIG. 2A, all of the electronic shelves 211-21N can be registered to a network between the electronic shelves 211-21N, the electronic device 220 and a server 230. A registration table can be generated by the server 230 for recording a plurality of identification information respectively corresponding to the electronic shelves 211-21N, and the registration table can be stored in the server 230. The server 230 may be a back-end server. The electronic device 220 may be a mobile phone, or any other hand-held electronic device well known in this art.

During the pairing operation, all of the electronic shelves 211-21N can be wirelessly or non-wirelessly connected in the network with the electronic device 220 and the server 230. The electronic device 220 can firstly send a notification to the electronic shelves 211-21N. In response to the notification, the electronic shelves 211-21N respectively display a plurality of code marks ID1-IDN. The code marks ID1-IDN respectively include the identification information of the electronic shelves 211-21N. The electronic device 220 can get a captured image of one of the code marks ID1-IDN to select one of the electronic shelves 211-21N to be the target electronic shelf. Take the electronic shelf 211 to be the target electronic shelf as an example. The electronic device 220 can get a captured image CMG of the code mark ID1, and identify the captured image CMG of the code mark ID1 to get the identification information of the electronic shelf 211. The electronic device 220 further communicates with the server 230 through the network according to the identification information of the electronic shelf 211, and the server 230 searches the electronic shelves 211-21N registered to the network for the target electronic shelf according to the identification information of the electronic shelf 211. Such as that, the electronic shelf 211 can be paired to be the target electronic shelf.

In present embodiment, the code marks ID1-IDN can be QR (quick response) code marks, bar-code marks or any other code mark well known in the art.

In additional, after the pairing operation is finished, the electronic device 220 can send another notification to inform the electronic shelves 211-21N that the pairing operation is finished. The electronic shelves 211-21N can stop to display the code marks 211-21N for power saving.

Figure 2B:
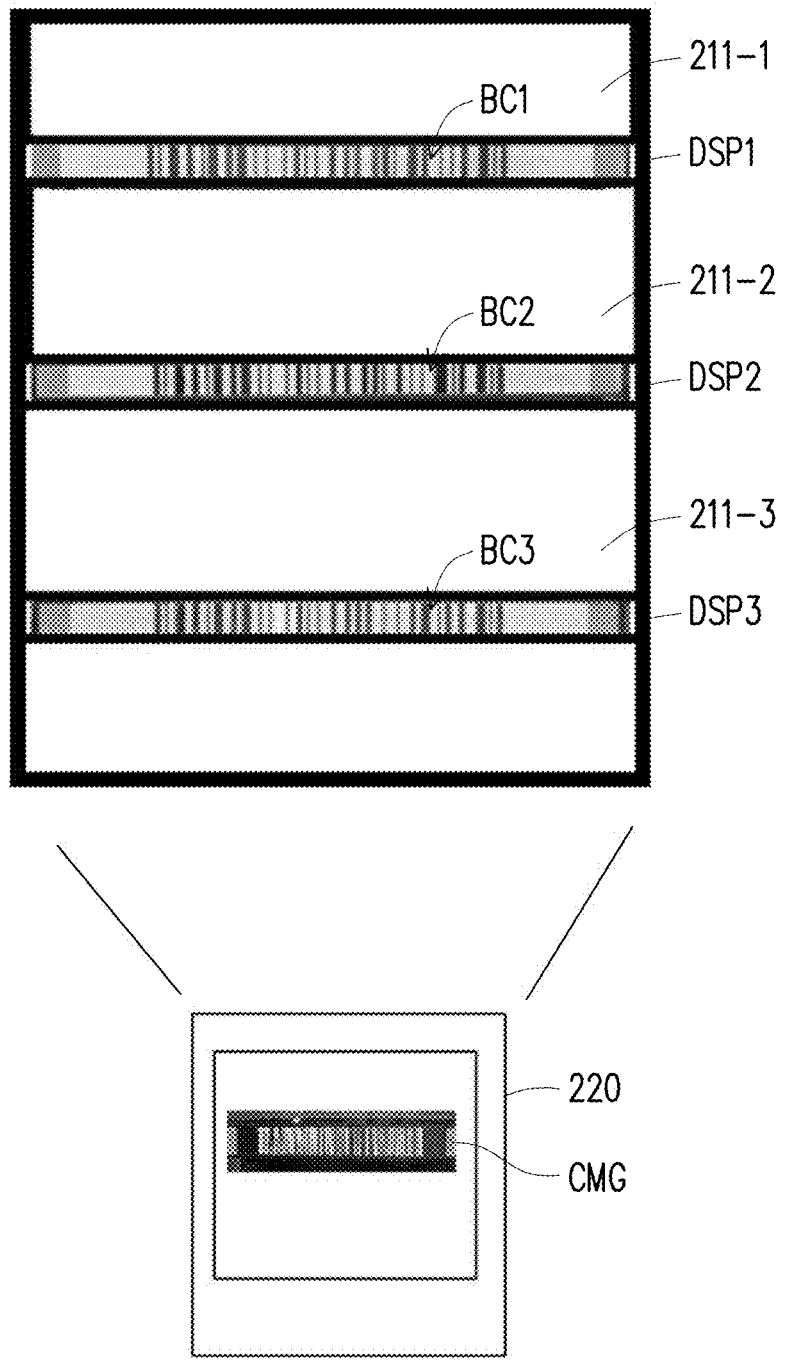
FIG. 2B illustrates a schematic plot of the pairing operation according to the embodiment of FIG. 2A.

Please refer to FIG. 2B, which illustrates a schematic plot of the pairing operation according to the embodiment of FIG. 2A. In FIG. 2B, a plurality of electronic shelves 211-1~211-N and a plurality displays DSP1-DSPN are disposed, and the displays DSP1-DSPN are respectively corresponding to the electronic shelves 211-1~211-N. During the pairing operation, the displays DSP1-DSPN may respectively provide bar-code images BC1-BCN, where the bar-code images are respectively corresponding to the electronic shelves 211-1~211-N. Moreover, the electronic device 220 can capture image of one or more bar-code images BC1-BCN by using its camera. By analyzing the captured image, one or more bar-code images BC1-BCN can be identified, and at least one of the electronic shelves 211-1~211-N can be paired to be the target electronic shelf.

In some embodiment, the pairing operation mentioned above is not necessary. One or more electronic shelves can be pre-defined to be the at least one target electronic shelf, and link with the electronic device and a server with a network.

Figure 3:
FIG. 3 is a schematic plot of a captured image of the goods on a target electronic shelf according to an embodiment of present disclosure.

After the electronic shelf 211 is selected or identified to be the target shelf, the electronic device 220 may get at least one captured image of the one or more goods on the electronic shelf 211. Please refer to FIG. 3, which is a schematic plot of a captured image of the goods on a target electronic shelf according to an embodiment of present disclosure. The captured image 300 includes five goods objects which are cookie A, cookie B, puff A, cake A and puff B. The electronic device 220 can perform an image processing on the captured image 300 to obtain the feature information associated with the goods objects. Alternatively, in another embodiment, image information of the captured image 300 can be transmitted to the server 230, and the server 230 can perform the image processing on the image information associated to the captured image 300 to obtain the feature information associated with the goods objects.

Different algorithms can be used. For example, the image processing on the captured image 300 may be performed based on an Artificial Intelligence (AI) process.

Figure 4A:
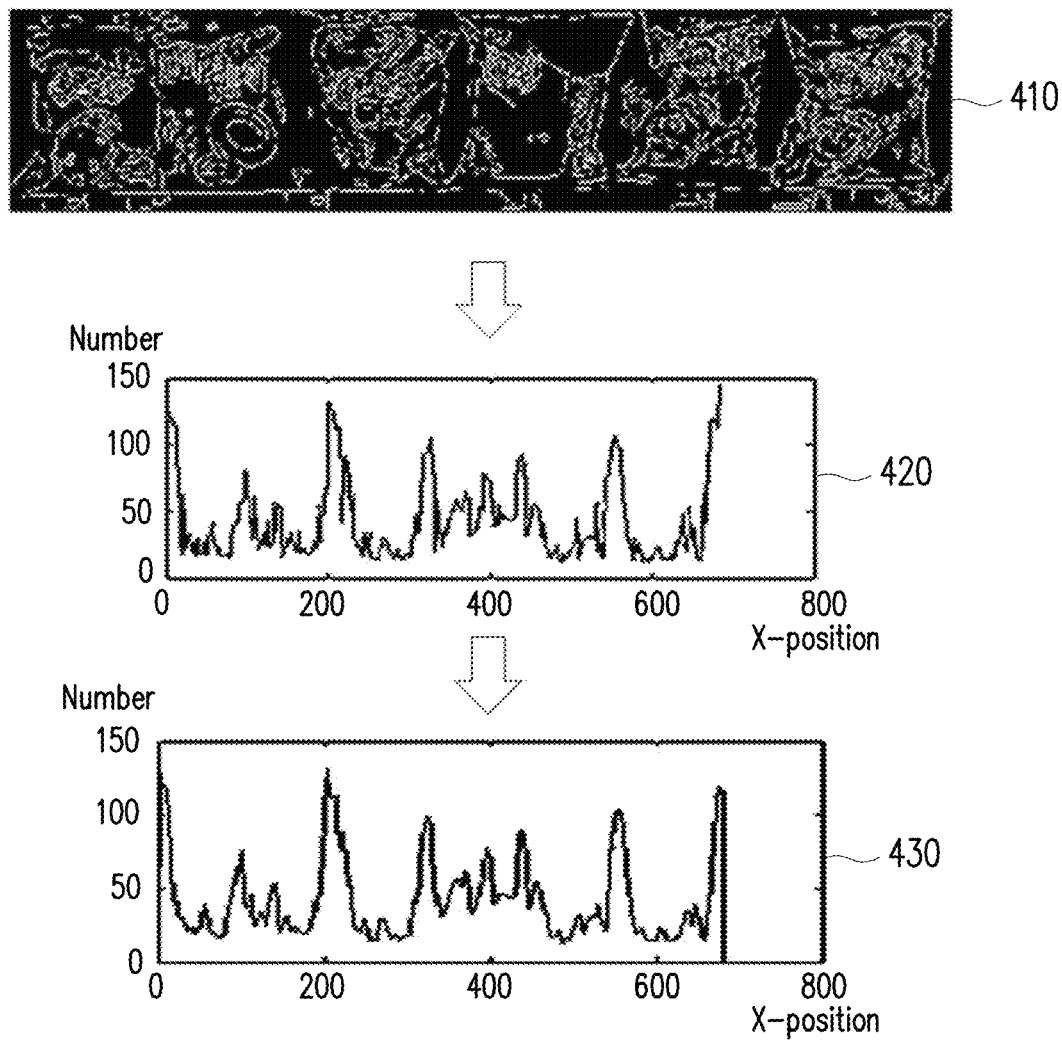
FIG. 4A and FIG. 4B are schematic plots of the image processing on the captured image of the goods objects according to an embodiment of preset disclosure.
Figure 4B:
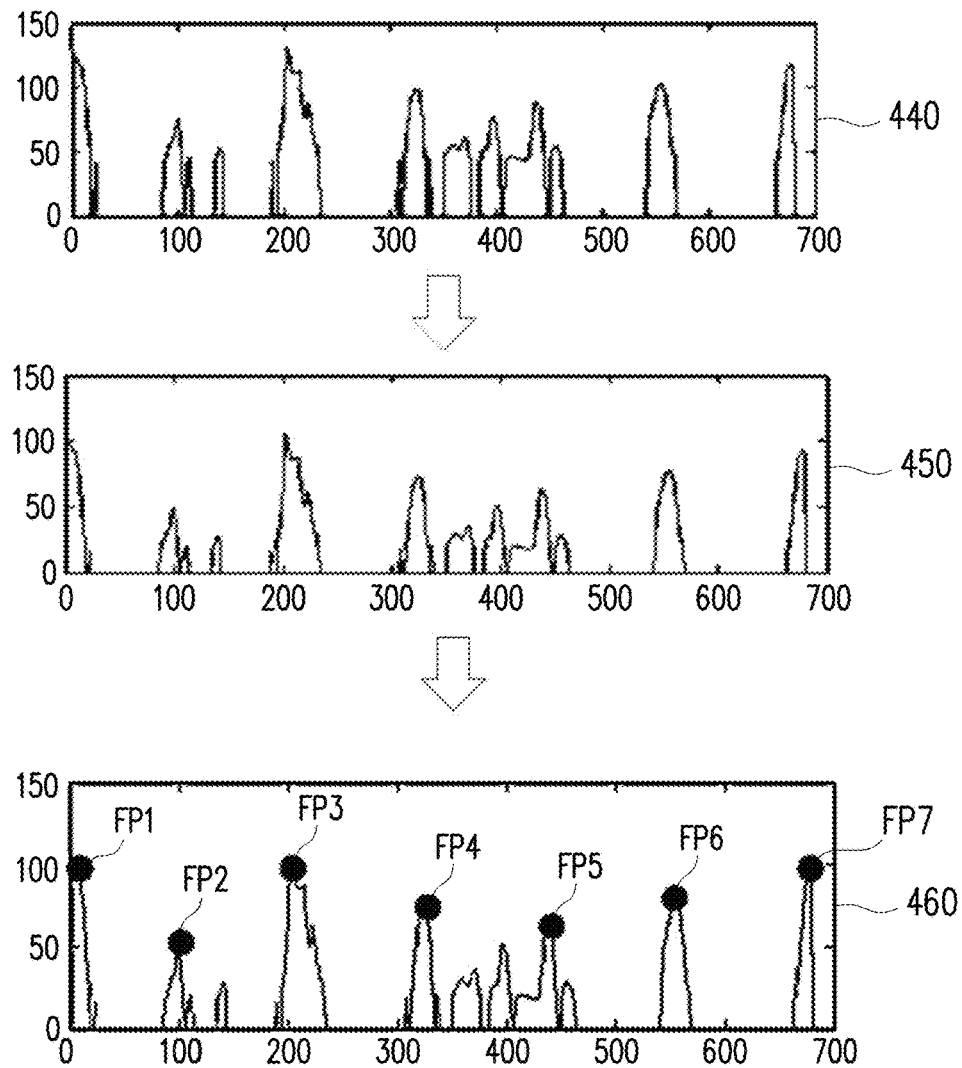

Detail of the image processing can be seen in FIG. 4A and FIG. 4B, which are schematic plots of the image processing on the captured image of the goods objects according to an embodiment of preset disclosure. In FIG. 4A, take the image processing being executed by the electronic device as an example, the electronic device of present disclosure can transform the captured image 300 to a gray-level image, and perform an edge detection operation on the gray-level image to obtain an edge points image 410. The edge detection operation can be applied by Canny edge detection algorithm or any other edge detection and/or edge enhancement algorithm well known by a person in the art.

Then, along a horizontal axis (X-axis), the electronic device can scan each of a plurality of columns of the edge points image 410, and calculates a number of continuous black pixels in each of the rows to establish a first relation plot 420 between the number of black pixels and a position (X-position) in the X-axis of the edge points image 410. Further, the electronic device performs a smooth operation on the number of black pixels in the first relation plot 420 to obtain a second relation plot 430.

In the FIG. 4B, according to the second relation plot 430, the electronic device performs a first trimming operation according to the second relation plot 430. In the first trimming operation, the electronic device calculates a first average value of all of the numbers of black pixels. By setting the first average value to be a first threshold value, the electronic device further trims the numbers of black pixels according to the first threshold value to generates a first trim plot 440. Wherein, the electronic device compares each of the numbers of black pixels with the first threshold value. If the number of black pixels is larger than the first threshold value, the electronic device keeps the number of black pixels unchanged; and if the number of black pixels is not larger than the first threshold value, the electronic device trims the number of black pixels to zero.

The electronic device may perform a second trimming operation according to the first trim plot 440. In the second trimming operation, the electronic device ignores the numbers of black pixels which are zero, and calculates a second average of the numbers of black pixels which are not zero. The electronic device may set the second average value to be a second threshold value, and trims the numbers of black pixels in the first trim plot 440 according to the second threshold value to generates a second trim plot 450. Wherein, the electronic device compares each of the numbers of black pixels in the first trim plot 440 with the second threshold value. If the number of black pixels in the first trim plot 440 is larger than the second threshold value, the electronic device keeps the number of black pixels in the first trim plot 440 unchanged; and if the number of black pixels in the first trim plot 440 is not larger than the second threshold value, the electronic device trims the number of black pixels in the first trim plot 440 to zero.

After the second trim plot 450 is generated, the electronic device may group the curve in the second trim plot 450, and find out feature points FP1-FP7 of a plurality groups shown as in the trim plot 460. Wherein each of the feature points FP1-FP7 is a maximum value of corresponding group.

The electronic device further generates a plurality of dividing lines according to the feature points FP1-FP7. The dividing lines are used to divide the goods objects in the captured image. It can be seen in FIG. 5, which illustrates an edge detection result according to an embodiment of present disclosure. Also take the image processing being executed by the electronic device as an example. In one embodiment, firstly, the electronic device may calculate a first distance between the feature points FP1 and nearest boundary of the capture image 500, and calculate a second distance between the feature points FP7 and nearest boundary of the captured image 500. Since each of the good object has a minimum width, the electronic device can delete the feature points FP1 if the first distance is smaller than a first preset reference value, and delete the feature points FP7 if the second distance is smaller than the first preset reference value. Secondly, the electronic device may calculate a plurality of third distances between any two adjacent feature points of the feature points FP2-FP6. If a standard deviation of the third distances is greater than a preset second reference value, the electronic device may select a smaller one of the two adjacent feature points which has minimum distance to delete. Then, the standard deviation based on remained feature points can be calculated again, and the electronic device can determine whether to delete another feature point or not by comparing the standard deviation with the preset second reference value. If the standard deviation is not greater than the preset second reference value, the electronic device can set remained feature points to a plurality of final feature points, and generate the dividing lines DL1-DL4 according to positions of the final feature points. According to the dividing lines DL1-DL4, a plurality of position information of the goods objects in the captured image 500 can be generated, and a plurality of sub-images SIM1-SIMS of the goods objects can be identified by the electronic device according to the position information.

The electronic device can further perform feature transformation operation on each of the goods objects of the captured image based on the sub-images SIM1-SIMS. The electronic device may apply SIFT (Scale-Invariant Feature Transform) algorithm on each of the sub-images SIM1-SIMS to obtain the feature information. In other embodiments, the electronic device may perform SURF (Speeded-Up Robust Features), BRIEF (Binary Robust Independent Elementary Features), FAST (Features From Accelerated Segment Test), ORB (Oriented FAST and Rotated BRIEF) methods, deep Learning based feature extracting method such as: inception V3, ResNet (Deep residual network), or any other feature extracting method well known by a person skilled in the art to obtain the feature information.

Please be noted here, in some embodiment, the electronic device may display the captured image 500 with the dividing lines DL1-DL4. Such as that, a user can check positions of the dividing lines DL1-DL4 are correct or not, and can manually adjust the position of any one of the dividing lines DL1-DL4. Of course, if the user finds some dividing line is not shown in the captured image 500, the user can add it manually. On the other hand, if the user finds of any one of the dividing lines DL1-DL4 is not necessary, the user can remove it manually, too.

Figure 5:
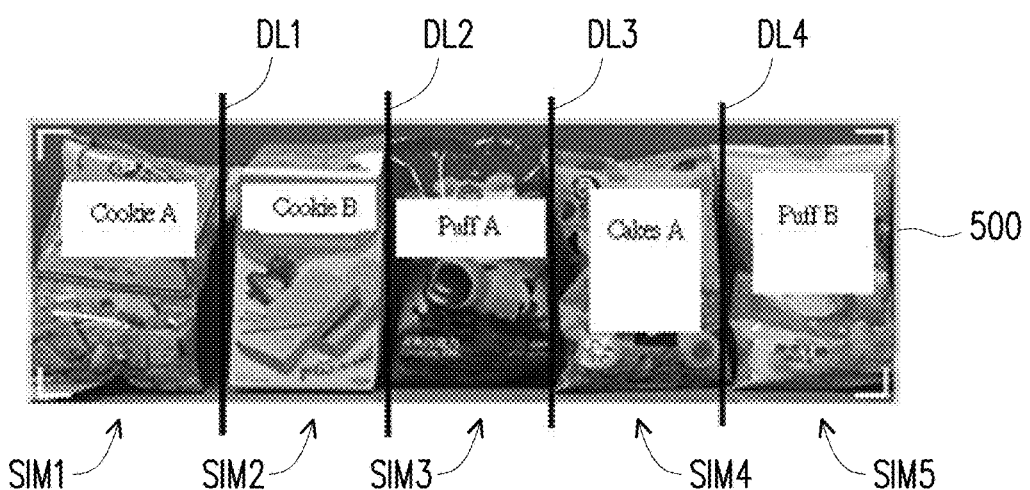
FIG. 5 illustrates an edge detection result according to an embodiment of present disclosure.

It should be noted here, the embodiments of FIGS. 4A, 4B and 5 can be performed in the server, too. The server can perform the image processing on the image information of the captured image 300 to obtain the feature information.

In the following, operation methods applicable to a server are shown with FIGS. 6A-6D, respectively corresponding to FIGS. 1A-1D which are used illustrate the operation methods applicable to an electronic device communicating with the server. In other words, adjustment of display information is performed with cooperation of the server with the electronic device, so operation methods are described in FIGS. 1A-1D for steps performed by the electronic device and are described in FIGS. 6A-6D for steps performed by the server.

Figure 6A:
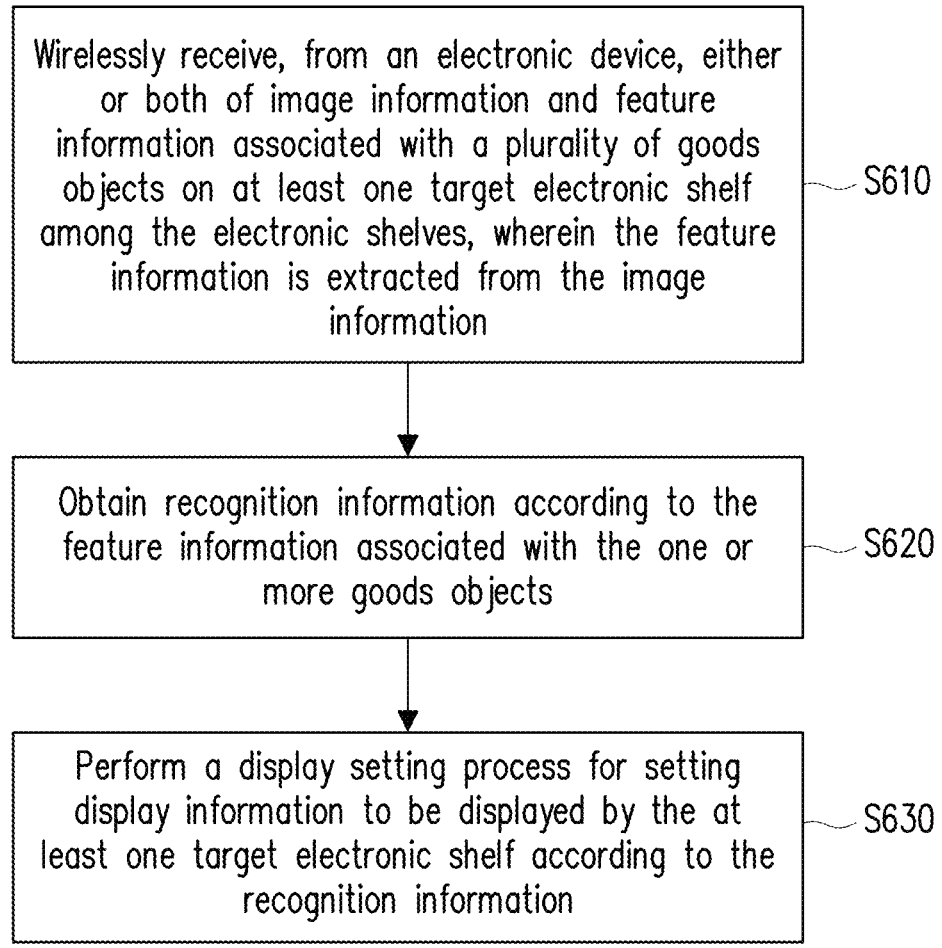
FIGS. 6A-6D are a plurality of flow charts of operation methods with goods information for controlling a plurality of electronic shelves in a network according to a plurality of embodiments of present disclosure.

Referring to FIG. 6A, which illustrates a flow chart of an operation method with goods information for controlling a plurality of electronic shelves in a network according to another embodiment of present disclosure. The flow chart in FIG. 6 is applicable to a server connected with the electronic device as mentioned in FIG. 2. In a step S610, the server wirelessly receives, from the electronic device, either or both of image information and feature information associated with a plurality of goods objects on at least one target electronic shelf among the electronic shelves, wherein the feature information is extracted from the image information. In other words, the server can receive the feature information from the electronic device which has extracted the feature information based on captured images associated with the one or more goods on the at least one target electronic shelf. Then, the server can obtain recognition information according to the feature information associated with the good objects (a step S620). In detail, the server can analyze the feature information to obtain recognition information. For example, the server may analyze the feature information by K-means clustering and VLAD (Vector of Locally Aggregated Descriptor) algorithm, and also compare the feature information with a data bank to out each of the goods objects in the captured image. Further, the server can obtain first display setting information according to the recognition information by performing a display setting process in a step S630, and the first display setting information can be displayed by the at least one target electronic shelf. The first display setting information may include goods information associated the goods object such as a name, a price, an article number, and a brief image of each of the goods objects. The first display setting information may also include position information associated with the goods objects. The server also can communicate with the target electronic shelf according to the first display setting information in the step S630. More details of steps S610-S630 can be referred to corresponding steps S110-S120 of FIG. 1A applicable to the electronic device and omitted here for brevity.

Figure 6B:
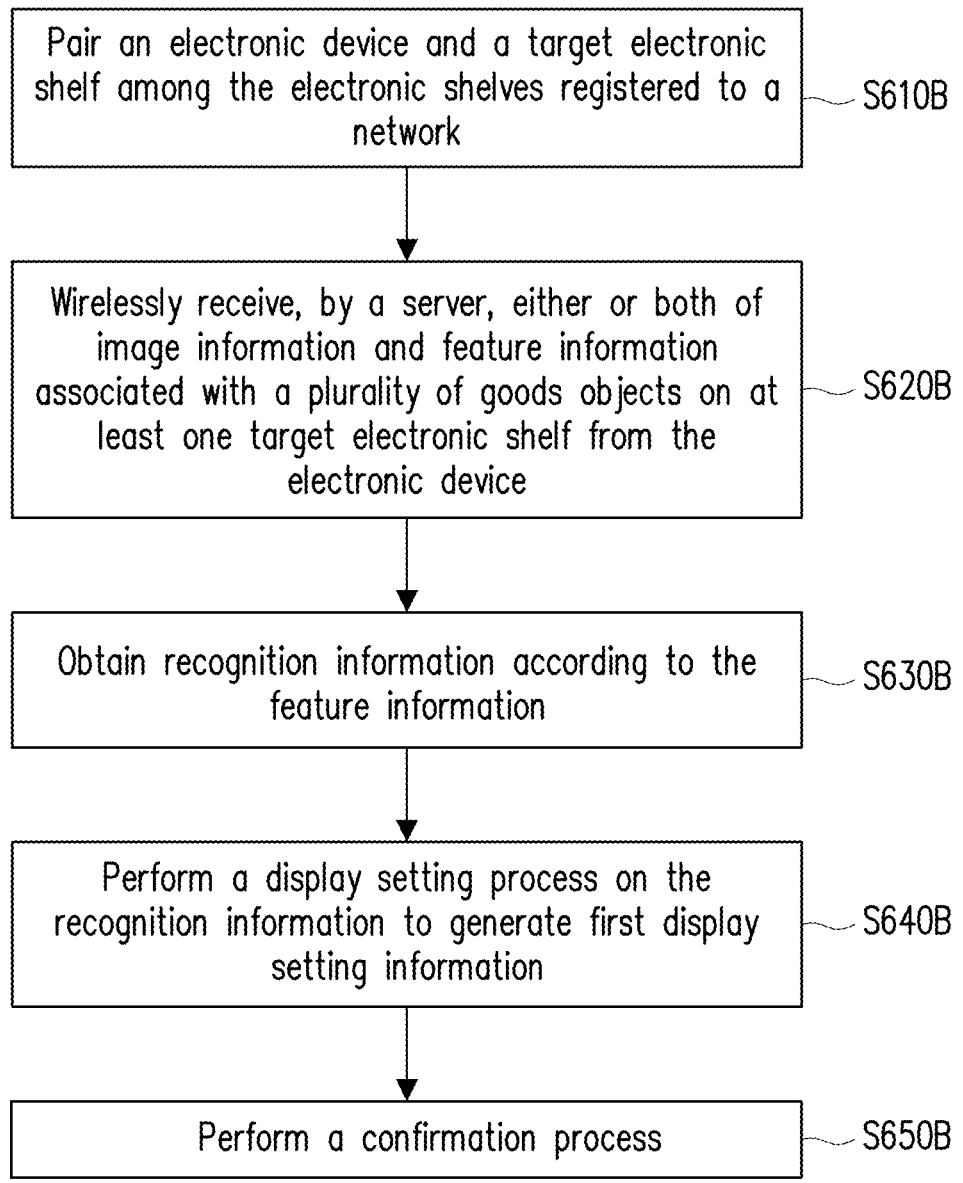

Please refer to FIG. 6B, which illustrates a flow chart of an operation method with goods information for controlling a plurality of electronic shelves in a network according to another embodiment of present disclosure. In a step S610B, a pairing operation can be performed by the server to identify or select at least one electronic shelf among the electronic shelves registered to a network to be at least one target electronic shelf. The pairing operation involves cooperation with the electronic device. More details of step S610B can be referred to corresponding step S110B of FIG. 1B applicable to the electronic device and details of FIGS. 2A and 2B and are omitted here for brevity.

Then, in a step S620B, a server may wirelessly receive either or both of image information and feature information associated with a plurality of goods objects on at least one target electronic shelf from the electronic device. The generation of the feature information involves cooperation with the electronic device. This means that, the electronic device or the server may obtain feature information associated with one or more goods objects of the target electronic shelf according to a captured image of the one or more goods objects obtained by the electronic device. More details of step S620B can be referred to corresponding step S120B of FIG. 1B applicable to the electronic device and details of FIGS. 3-5 and are omitted here for brevity.

The server can obtain recognition information according to the feature information in a step S630B. The server can obtain the recognition information based on matching between goods data stored in a database and the feature information.

The server further performs a display setting process based on the recognition information to generate first display setting information in a step S640B. The first display setting information can be transmitted to the at least one target electronic shelf which can then display goods information on the electronic shelf label or electronic shelf display based on the first display setting information.

Alternatively or additionally, the first display setting information can be transmitted to the electronic device, which can perform a confirmation process according to the first display setting information in a step S650B.

The confirming process in the step S650B is used to confirming whether the goods information of first display setting information associated with the one or more goods objects is correct or not. During the confirming process, confirmation information can be obtained by the server through the electronic device. The user of the electronic device can confirm whether the goods information obtained by the server is correct or not and then provide an input to the electronic device indicating the confirmation result.

Figure 6C:
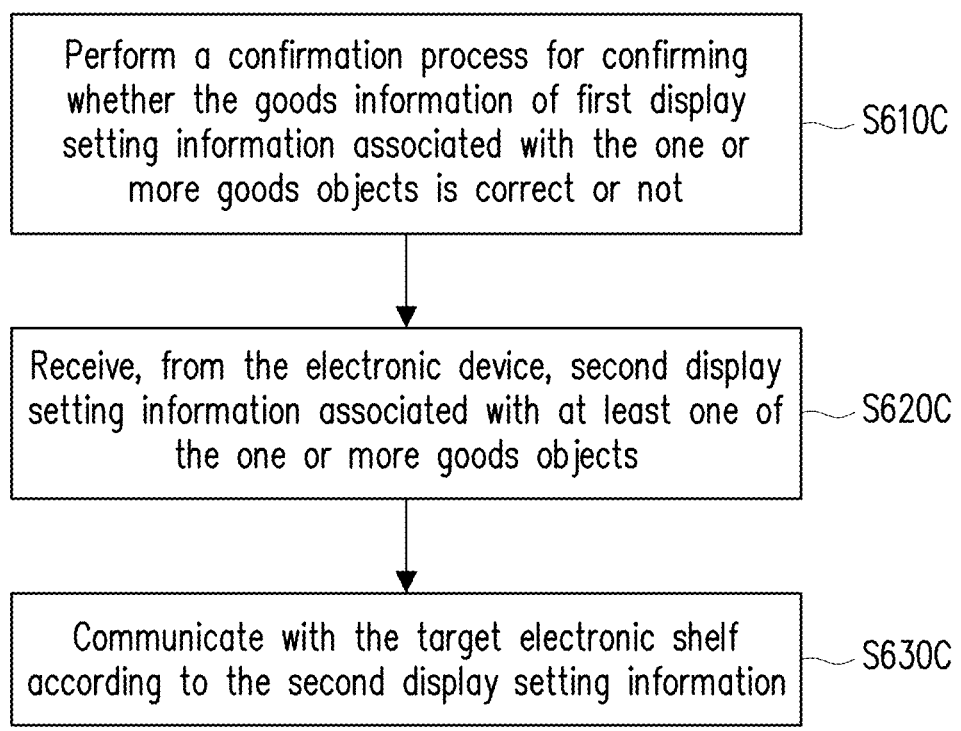
Figure 6D:
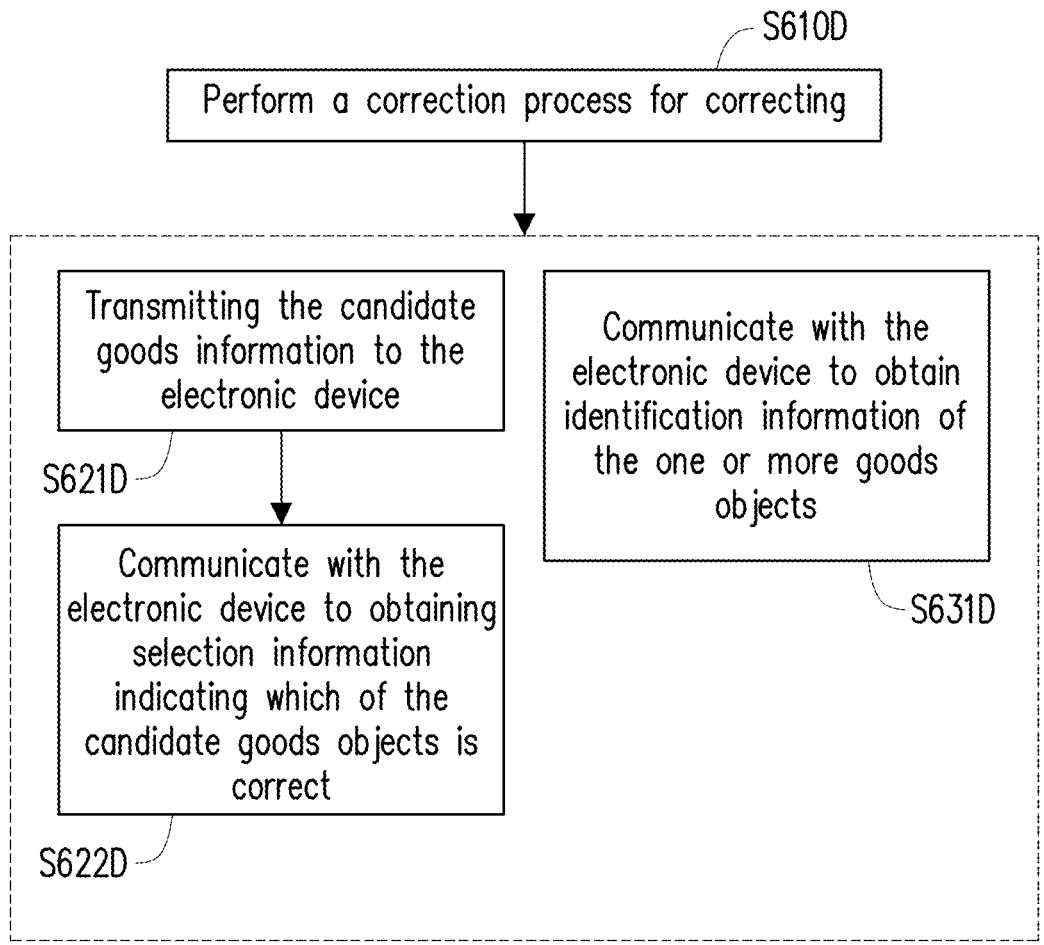

As will described by embodiments shown in FIGS. 6C-6D, respectively corresponding to FIGS. 1C and 1D, if a confirmation process has a positive result, the at least one target electronic shelf can display goods information on the electronic shelf label or electronic shelf display based on the first display setting information. Conversely, if the confirmation process has a positive result, a correction process may be also performed based on inputs of a user of the electronic device to correct the goods information provided by the server. This means that the server may receive corrected goods information from the electronic device. Furthermore, in some implementations, an additional manual adjustment can be also performed if the confirmation process has a positive result. The additional manual adjustment can be also performed if the confirmation process has a negative result but the correction process is finished. This means that the server may receive second display setting information from by the electronic device, wherein the second display setting information may be more desired or satisfying to the user compared to the first display information. The confirmation process involves cooperation with the electronic device. More details of step S650B can be referred to corresponding step S140B of FIG. 1B applicable to the electronic device and are omitted here for brevity.

Please be noted here, the pairing operation performed in the step S610B is not necessary for some embodiments of present disclosure. In some embodiments, the step S610B can be skipped.

Please refer to FIG. 6C, which illustrates a flow chart of an operation method with goods information for controlling a plurality of electronic shelves in a network according to another embodiment of present disclosure. Continued with the embodiment in FIG. 6B, in FIG. 6C, a confirming process is performed for confirming whether the goods information of first display setting information associated with the one or more goods objects is correct or not in a step S610C.

If the confirmation process has a positive result, meaning that goods information provided by the server is confirmed to be correct by a user, an additional manual adjustment can be also performed. Steps S620C and S630C can achieve the manual adjustment by a user of the electronic device, leading to desired display effects of the electronic shelf labels or the electronic shelf display. In step S620C, if the first display setting information is not desired or satisfying to a user of the electronic device, a user may adjust the first display setting information to be the second display setting information which is more desired or satisfying than the first display setting information. In other words, the electronic device can generate second display setting information according to input by the user. The server may receive the second display setting information from the electronic device in a step S620C, where the second display setting information is associated with one or more goods objects. Furthermore, the server may communicate with the target electronic shelf according to the second display setting information in a step S630C, and the target electronic shelf can display images according to the second display setting information to have a more satisfying display effect. It is noted that the additional manual adjustment can be also performed if the confirmation process has a negative result but the correction process is finished. The confirmation process involves cooperation with the electronic device. More details of step S610C can be referred to corresponding step S110C of FIG. 1C applicable to the electronic device and are omitted here for brevity.

In this embodiment, if the first display setting information is confirmed to be satisfying or desired in the step S620C, the step S630C can be skipped and the first display setting information can be used by the target electronic shelf for displaying accordingly.

Please refer to FIG. 6D, which illustrates a flow chart of an operation method with goods information for controlling a plurality of electronic shelves in a network according to another embodiment of present disclosure.

In a step S610D, a correction process can be performed. The step S610D can be performed if the step S610C has a negative result. In addition, and the flow may go back to step S620C and 630C after the step S610D is finished and a manual adjustment is determined to be performed by the user of the electronic device.

During the step S610D, the server may transmit candidate goods information to the electronic device in a step S621D. The candidate goods information can be obtained by the server according to the feature information transmitted by the electronic device. The electronic device can provide the candidate goods information to the user for selection, and selection information can be obtained by the electronic device, which then sends the selection information to the server. Then, in a step S622D, the server communicates with the electronic device to obtain the selection information indicating which of the candidate goods objects is correct.

Alternatively or additionally, for example, if there is no correct item can be select in the candidate goods information, the user can capture identification of the unidentified goods object in the target shelf, and the server can communicate with the electronic device to obtain the identification information of the one or more goods objects (step S631D). The identification information can be recorded in a bar-code of the unidentified goods object, and the user can use the electronic device to scan the bar-code to obtain the identification information. The correction process involves cooperation with the electronic device. More details of steps S610D and S621D, S622D, and S631D can be referred to corresponding step S110D and S121D, S122D, S123D, and S131D and S132D of FIG. 1D applicable to the electronic device and are omitted here for brevity.

Figure 7:
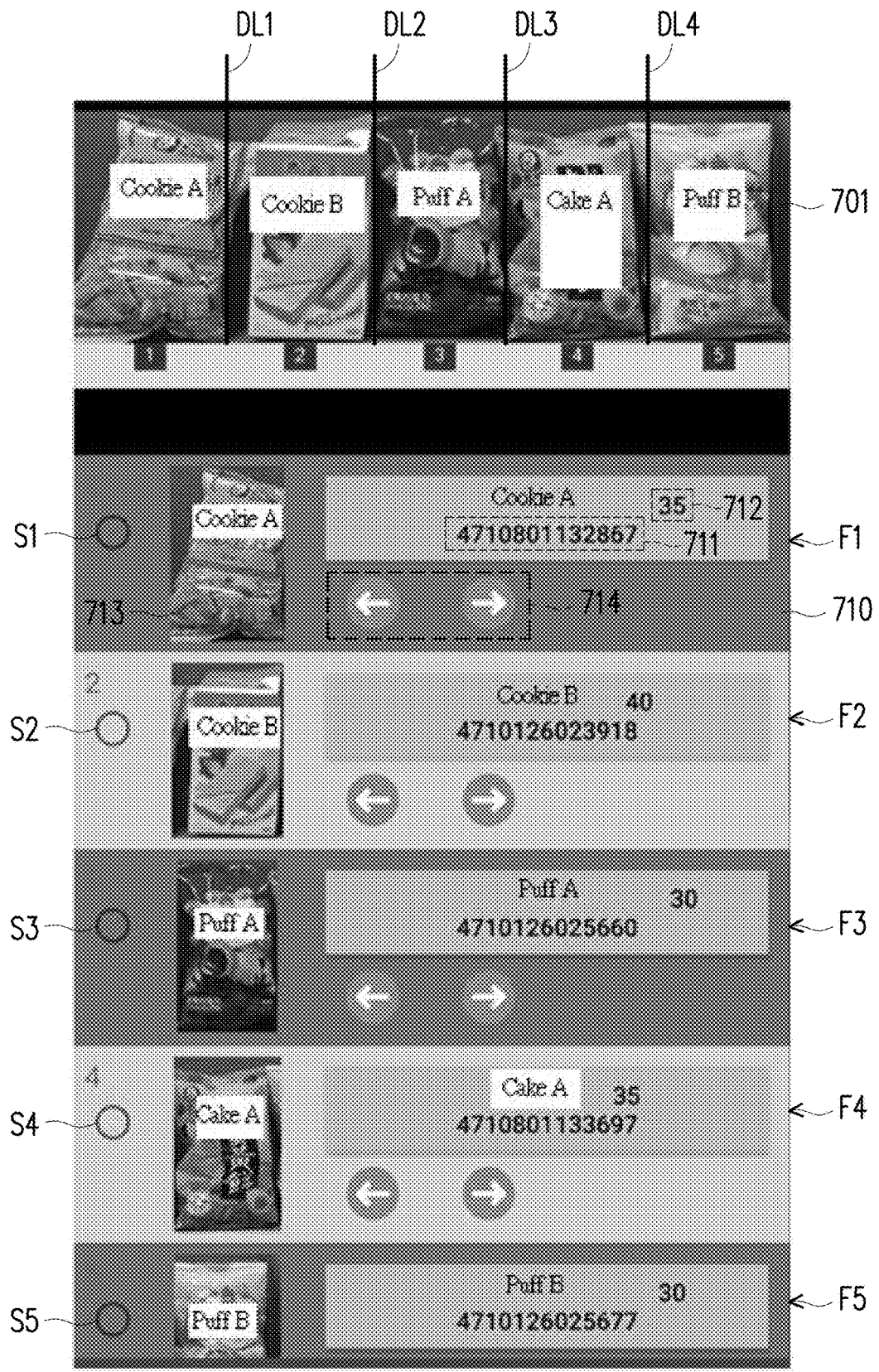
FIG. 7 illustrates a schematic plot of the first display setting information according to an embodiment of present disclosure.

Please refer to FIG. 7, which illustrates a schematic plot of the first display setting information according to an embodiment of present disclosure for illustrating a confirmation process, a correction process and a manual adjustment process. The first display setting information can be transmitted to an electronic device, and the electronic device can display the first display setting information on a graphic user interface (GUI). In FIG. 7, the captured image 701 (same as the captured image 500) can be shown on the GUI. The five goods objects can be coded in to numbers 1 to 5, where the cookie A is number 1, the cookie B is number 2, the puff A is number 3, the cake A is number 4, and the puff B is number 5. The GUI also shows division lines DL1-DL4 to point out the position information associated with the goods objects.

The GUI can provide an image 710 having a plurality of display areas F1-F5, and the display areas F1-F5 respectively correspond to the five goods objects numbered 1-5, respectively. Take the display area F1 as an example, where the display area F1 includes the goods object's name (Cookie A), the price 712, the code information 711 and the brief image 713. The GUI also can provide a selection blank S1 and an adjust button 714 on the display area F1 for performing the manual adjustment.

On the other hand, in present embodiment, the electronic device also can perform a confirmation process through the GUI for confirming whether the goods information of first display setting information associated with the one or more goods objects is correct or not. The electronic device obtains confirmation information through the GUI during the confirmation process according to an input received from a user of the electronic device.

The electronic device can also perform a correction process through the GUI for correcting the goods information of the first display setting information associated with the one or more goods objects when the goods information of the first display setting information is not correct. If the user wants to correct good information of any one of the goods objects, the user can make the input by touching one of the selection blanks S1-S5. Also, if the goods information in the display area F1 mismatches with the number 1 goods object, the user can select the display area F1 for adjustment. For example, the user can make a long touch on the display area F1, and the GUI may provide a correction list.

The electronic device can also perform a manual adjustment process through the GUI for adjusting the first display setting information (particularly the position information) associated with the one or more goods objects when the user considers the first display setting information is not satisfying or desired. If the selection blanks S1 is selected, the user can use the adjust button 714 to adjust a position of the division line DL1 to generate position adjustment information associated with the corresponding goods object.

Figures 8, 9:
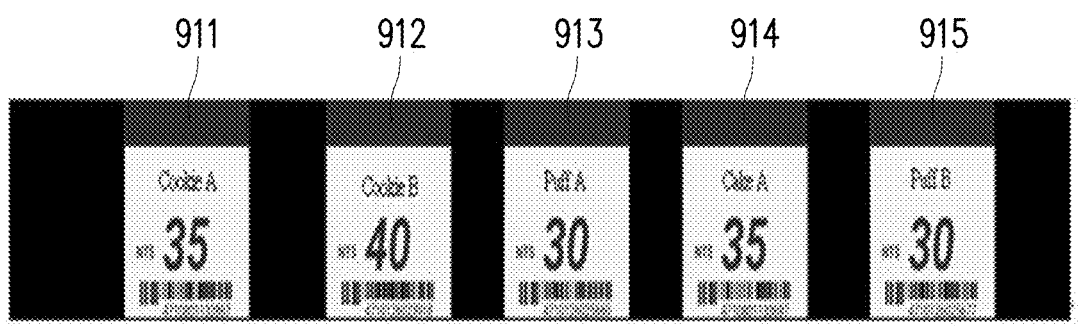
FIG. 8 illustrate a schematic plot of a correction list used in a correction process according to an embodiment of present disclosure.
FIG. 9 illustrates images displayed by an electronic shelf display of a target electronic shelf according to an embodiment of present disclosure.

Please refer to FIG. 8, which illustrate a schematic plot of a correction list used in a correction process according to an embodiment of present disclosure for explaining a correction process. The correction list may be displayed by a graphic user interface (GUI) on the electronic device for a user of the electronic device to control the correction process. In FIG. 8, during the correction process, the correction list 800 may provide a plurality of candidate goods information 810-850 associated with a plurality of candidate goods objects. In this embodiment, the correction list 800 may provide five candidate goods information 810-850, and in another embodiments, the correction list may provide more or less candidate goods information and no special limitation here.

In this embodiment, the candidate goods information can be received from the server by a wireless communicating. The server can perform an Artificial Intelligence (AI) computation according to feature information of the captured image to generate the candidate goods information.

Moreover, the user can select the correct candidate goods information (i.e. the candidate goods information 810) by an input, and the electronic device can generate selection information according to the input from the user. The electronic device can further wirelessly communicate with the server according to the selection information indicating which of the candidate goods objects is correct.

On the other hand, if the user fails to find the correct goods information in the candidate goods information 810-850, the user can select the "scan barcode" option. The electronic device can activate a bar-code scanning application to scan the unidentified goods object, and the good information can be corrected. That is, during the correction process, identification information of incorrect goods object can be obtained according to a captured image. The identification information may be a code information (bar-code) of the incorrect goods object.

On the other hand, the user can select the "set empty" option if the corresponding goods object is empty.

After the correction process is finished, the server can receive corrected goods information from the electronic device and then set the target electronic shelf based on the corrected goods information. In some implementations, a manual adjustment may be further performed, during which the electronic device may generate a second display information associated with the one or more goods objects, where the second display information may include the position adjustment information mentioned above. The electronic device further performs a second communicating with the server, and wirelessly transmitting the second display setting information associated with the one or more goods objects to the server through the second communicating.

Please refer to FIG. 9, which illustrates images displayed by an electronic shelf display of a target electronic shelf according to an embodiment of present disclosure. Display information 900 can be transmitted to the target electronic shelf by the server. The display information 900 includes goods information 911-915, and the goods information 911-915 can be respectively aligned with corresponding goods objects on the target electronic shelf. In present disclosure, all of the goods information 911-915 can be displayed on a same electronic shelf label/display.

Besides, the electronic device of present disclosure may include a non-transitory computer readable medium and a processor. The non-transitory computer readable medium has stored thereon software instructions and is executable by the processor. When the software instructions executed by a processor, the processor can execute the steps S110-S120 in FIG. 1 of present disclosure.

The server of present disclosure may also include a non-transitory computer readable medium and a processor, too. The non-transitory computer readable medium has stored thereon software instructions and is executable by the processor. When the software instructions executed by a processor, the processor can execute the steps S610-S620 in FIG. 6 of present disclosure.

Figure 10A:
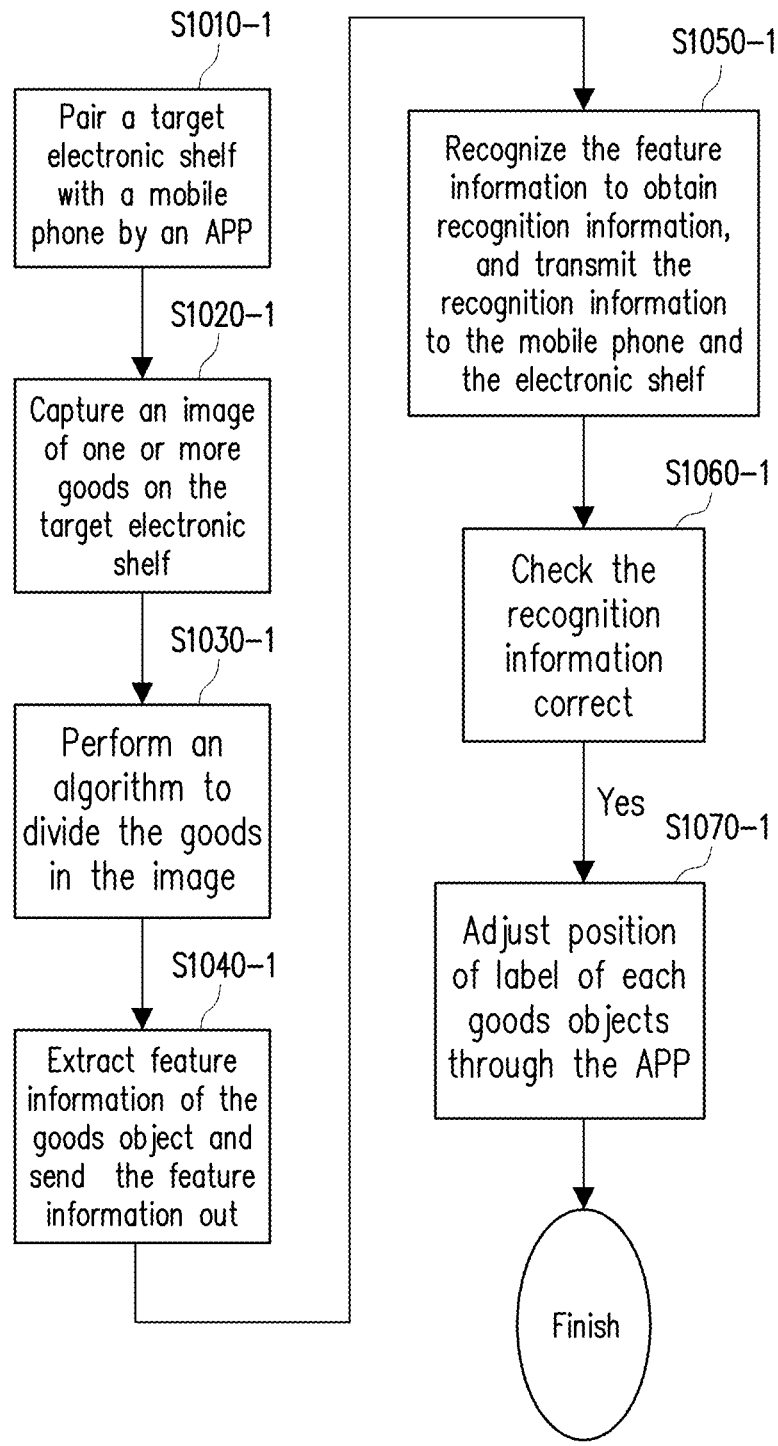
FIG. 10A illustrates a flow chart of an operation method for an electronic shelf system according to an embodiment of present disclosure.

Please refer to FIG. 10A, which illustrates a flow chart of an operation method for an electronic shelf system according to an embodiment of present disclosure. In a step S1010-1, a target electronic shelf (or several target electronic shelves) can be paired with an electronic device (i.e. a mobile phone) by an APP (application) executed by the electronic device. Then, in a step S1020-1, the mobile phone can capture an image of one or more goods object on the target electronic shelf, and the mobile phone performs an algorithm to extract feature information of the goods in the image (in a step S1030-1). The algorithm can include an edge detection or image processing algorithm well known by a person skilled in the art. In a step S1040-1, feature information of the goods objects can be extracted by the mobile phone, and the feature information can be sent out to a server from the mobile phone.

Please be noted here, in some embodiment, the steps S1030-1 and S1040-1 can be performed by the server. The mobile phone can transmit image information of the captured image obtained in the step S1020-1 to the server, and the server can perform the algorithm to divide the goods in the image (the step S1030-1), and obtain the feature information. This means that the server can perform the algorithm based on image information about the captured image received from the mobile phone without receiving the feature information from the mobile phone.

In a step S1050-1, the server is configured to recognize the feature information to obtain recognition information, and transmit the goods information (for example, the recognition information) to the mobile phone and the target electronic shelf.

Further, the electronic device can provide the recognition information to a user of the electronic device by a display, for example, according to the embodiment shown in FIG. 7, and in a step S1060-1, a confirmation process is performed in which the recognition information can be confirmed to be correct or incorrect by the user.

In an optional step S1070-1, if there is a positive confirmation result (YES), the user can make a manual adjustment for slightly adjusting the position of electronic shelf label for each good object through the APP when the user considers the position provided by the server is not desired or satisfying, and then the operation method can be finished.

In some alternative embodiments, the confirmation process of step S1060-1 can be skipped, and the user can directly adjust the position of the electronic shelf label of each good object through the APP after the recognition information is transmitted to the mobile phone and the target electronic shelf.

Figure 10B:
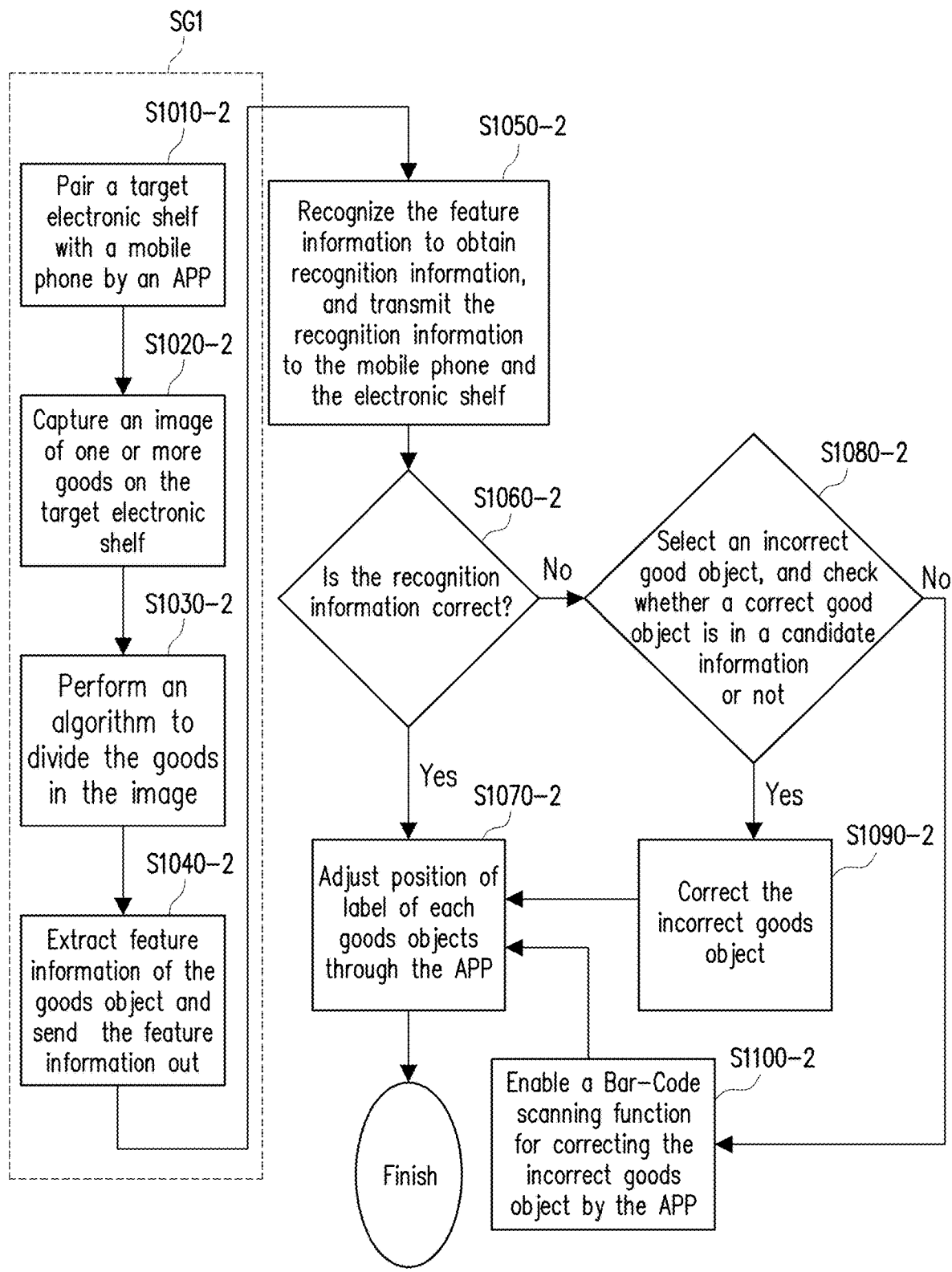
FIG. 10B illustrates a flow chart of an operation method for an electronic shelf system according to another embodiment of present disclosure.

Please refer to FIG. 10B, which illustrates a flow chart of an operation method for an electronic shelf system according to another embodiment of present disclosure. In a step S1010-2, a target electronic shelf is paired with an electronic device (i.e. a mobile phone) by an APP (application). Then, in a step S1020-2, the mobile phone captures an image of one or more goods object on the target electronic shelf, and the mobile phone performs an algorithm to divide the goods in the image (in a step S1030-2). The algorithm can be an edge detection algorithm well known by a person skilled in the art. In a step S1040-2, feature information of the goods objects can be extracted, and the feature information can be sent out to a server. In a step S1050-2, the server is configured to recognize the feature information to obtain recognition information, and transmit the recognition information to the mobile phone and the target electronic shelf. In a step S1060-2 (a confirmation process), a user of the mobile phone judges whether the recognition information is correct or not.

If the recognition information is correct, a step S1070-2 can be executed, and if the recognition information is not correct, a step S1080-2 can be executed to start a correction process including steps S1080-2, S1090-2, and S1100-2.

In the step S1070-2, a manual adjustment is performed in which the user can adjust position of the electronic shelf label of each good object through the APP, and then the operation method can be finished.

In the step S1080-2, the user can select an incorrect good object, and check whether a correct good object is in a candidate information or not. If the correct good object is in the candidate information, the user can correct the incorrect good object (a step S1090-2). On the contrary, if the correct good object is not in the candidate information, a Bar-Code scanning function can be enabled for correcting the incorrect goods object by the APP (in a step S1100). If all of the incorrect goods objects are corrected, flow of the operation method can be finished.

The details of the steps S1010-2-S1100-2 have been described in the embodiments mentioned before, and no more repeated description here.

Figure 10C:
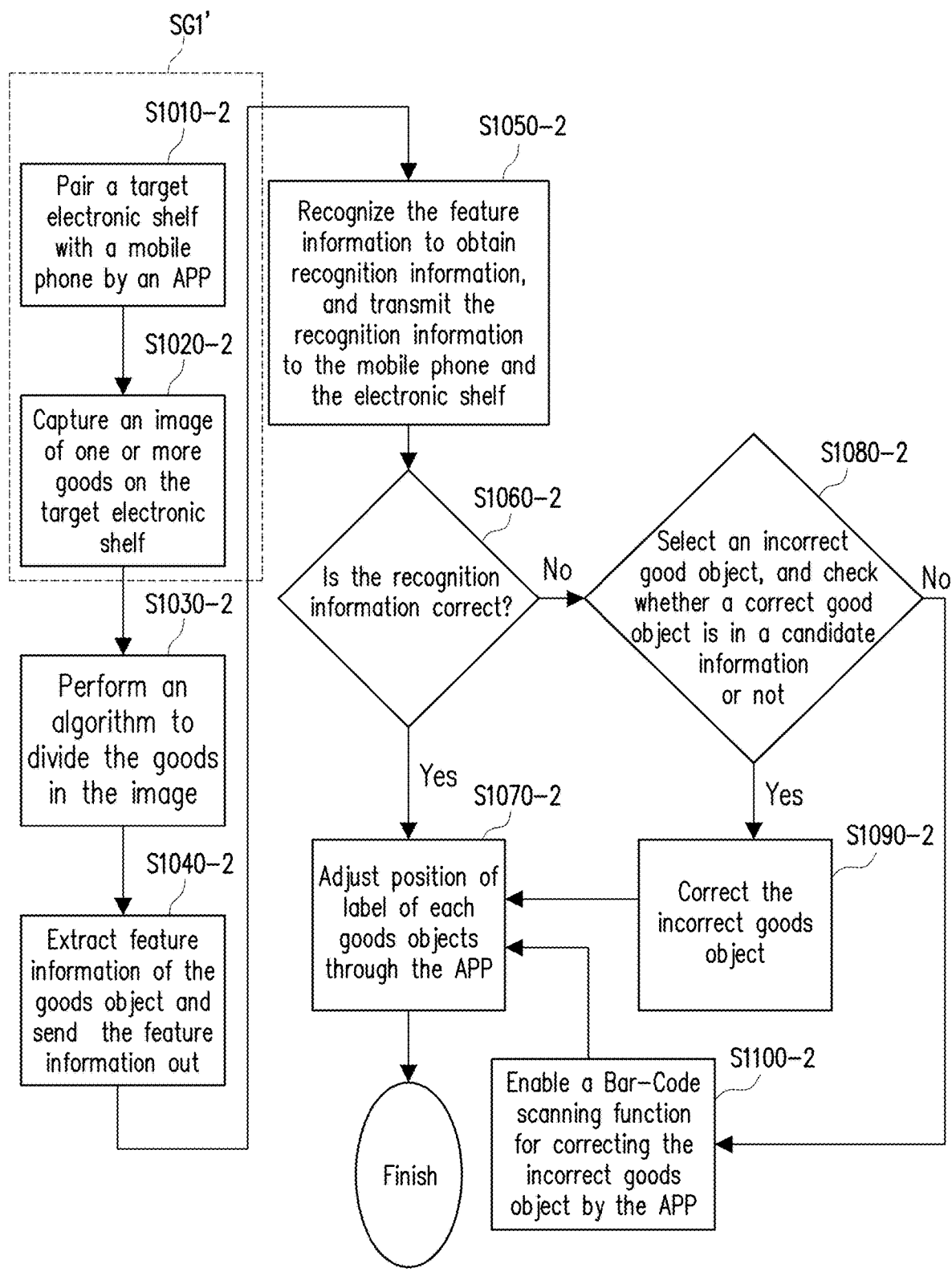
FIG. 10C illustrates another flow chart of the operation method for an electronic shelf system according to the embodiment of FIG. 10B.

Please be noted here, in this embodiment, a steps group SG1 including the steps S1010-2 to S1040-2 may be performed by the mobile phone in this embodiment. On the other hand, please refer to FIG. 10C, a steps group SG1' including the steps S1010-2 to S1020-2 can be performed by the mobile phone, and the steps S1030-2 to S1040-2 can be performed by the server. In here, FIG. 10C illustrates another flow chart of the operation method for an electronic shelf system according to the embodiment of FIG. 10B.

In summary, the present disclosure provides an electronic device to obtain either or both of image information and feature information associated with one or more goods objects on a target electronic shelf, and transmit either or both of the image information and the feature information to a server. The present disclosure also provides the server to recognize the feature information to generate display setting information. The electronic device can provide an interface for confirmation, correction and/or manual adjustment, and a correct display setting information can be displayed on an electronic shelf label of the target electronic shelf. Such as that, content displayed by the electronic shelf label can be automatically set or even further manually adjusted, and efficiency for the electronic shelves can be improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An operating method with goods information applicable to an electronic device, comprising:

pairing the electronic device to at least one target electronic shelf among the electronic shelves registered to a network by obtaining identification information of the at least one target electronic shelf according to a first captured image of the at least one target electronic shelf and communicating with a server according to the identification information of the at least one target electronic shelf to enable the server searches the electronic shelves registered to the network for the at least one target electronic shelf according to the identification information of the at least one target electronic shelf;

obtaining image information of a plurality of goods objects on at least one target electronic shelf among a plurality of electronic shelves in the network;

performing an edging detection operation on the image information of the plurality of goods objects to find out a plurality of feature points of a plurality of groups of the image information and generating a plurality of cutting lines according to the feature points, wherein each of the feature points has a maximum value of corresponding group;

providing merely one display to display a plurality of electronic shelf labels of the plurality of goods objects, and setting a position of each of a plurality of display regions according to each of the cutting lines, wherein each of the display regions is used display each of the electronic shelf labels of corresponding good; and performing first communicating with the server for controlling the electronic shelves in the network according to feature information extracted from the image information of the plurality of goods objects, wherein the first communicating comprises wirelessly transmitting the feature information of the plurality of goods objects to the server.

2. The operating method as claimed in claim 1, wherein the first communicating enables the server to set display information to be displayed by the at least one target electronic shelf according to the feature information of the plurality of goods objects.

3. The operating method as claimed in claim 1, wherein the first communicating further comprises wirelessly receiving first display setting information related to the feature information of the plurality of goods objects from the server.

4. The operating method as claimed in claim 3, wherein the first display setting information associated with the plurality of goods objects comprises at least one position information and goods information associated with the plurality of goods objects.

5. The operating method as claimed in claim 4, further comprising perfoii ling a confirmation process for confirming whether the goods information of first display setting information associated with the plurality of goods objects is correct or not.

6. The operating method as claimed in claim 5, wherein the confirmation process comprises obtaining confirmation information according to an input received from a user of the electronic device.

7. The operating method as claimed in claim 5, further comprising performing a correction process for correcting the goods information of the first display setting information associated with the plurality of goods objects when the goods information of the first display setting information associated with the plurality of goods objects is not correct.

8. The operating method as claimed in claim 7, wherein the goods information of the first display setting information comprises candidate goods information associated with a plurality of candidate goods objects, and the correction process comprises:
wirelessly receiving the candidate goods information from the server;
obtaining selection information indicating which of the candidate goods objects is correct according to an input received from the user of the electronic device; and
communicating with the server according to the selection information.

9. The operating method as claimed in claim 7, wherein the correction process comprises:
obtaining identification information of the plurality of goods objects according to a second captured image of the plurality of goods objects; and
communicating with the server according to the identification information.

10. The operating method as claimed in claim 9, wherein the second captured image of the plurality of goods objects comprises code information indicating the identification information of the plurality of goods objects.

11. The operating method as claimed in claim 3, further comprising:
obtaining second display setting information according to the first display setting information associated with the plurality of goods objects received from the server;
performing second communicating with the server about the second display setting information associated with the plurality of goods objects, wherein the second communicating comprises wirelessly transmitting the second display setting information associated with the plurality of goods objects to the server.

12. The operating method as claimed in claim 11, wherein the second display setting information comprises position adjustment information associated with at least one of the plurality of goods objects.

13. The operating method as claimed in claim 12, wherein the position adjustment information is determined according to an input from a user of the electronic device.

14. The operating method as claimed in claim 1, wherein the first captured images comprise code information indicating identification information of the at least one target electronic shelf.

15. The operating method as claimed in claim 1, wherein a step of obtaining the image information of the plurality of goods objects comprises:
obtaining at least one captured image of the plurality of goods objects on the at least one target electronic shelf.

16. The operating method as claimed in claim 15, further comprising:
performing an image processing on the at least one captured image to obtain the feature information of the plurality of goods objects; and
transmitting the feature information to the server.

17. The operating method as claimed in claim 16, wherein a step of performing the image processing on the at least one captured image to obtain the feature information of the plurality of goods objects:
performing an edge detection operation on the at least one captured image to obtain at least one position information of the plurality of goods objects; and
performing a feature transformation operation on the at least one captured image according to the at least one position information to obtain the feature information of the plurality of goods objects.

18. The operating method as claimed in claim 1, further comprising transmitting the image information to the server without extracting the feature information.

19. An operating method with goods information applicable to a server for controlling a plurality of electronic shelves in a network, comprising:
pairing an electronic device to at least one target electronic shelf among the electronic shelves registered to the network by communicating with the electronic device to obtain identification information of at least one target electronic shelf and searching the electronic shelves registered to the network for the at least one target electronic shelf according to the identification information of the at least one target electronic shelf;
wirelessly receiving, from the electronic device, feature information of a plurality of goods objects on the at least one target electronic shelf among the electronic shelves, wherein the feature information is extracted from image information of plurality of goods objects on the at least one target electronic shelf;

obtaining recognition information according to the feature information of the one plurality of goods objects; and performing a display setting process for setting display information to be displayed by the at least one target electronic shelf according to the recognition information, wherein an edging detection operation is performed on the image information of the plurality of goods objects to find out a plurality of feature points of a plurality of groups of the image information and a plurality of cutting lines is generated according to the feature points, wherein each of the feature points has a maximum value of corresponding group, wherein merely one display is provided to display a plurality of electronic shelf labels of the plurality of goods objects, and a position of each of a plurality of display regions is set according to each of the cutting lines, wherein each of the display regions is used display each of the electronic shelf labels of corresponding good.

20. The operating method as claimed in claim 19, wherein the display setting process comprises:

obtaining first display setting information according to the recognition information, and communicating with the at least one target electronic shelf according to the first display setting information.

21. The operating method as claimed in claim 20, wherein the first display setting information associated with the plurality of goods objects comprises position information and goods information associated with the plurality of goods objects.

22. The operating method as claimed in claim 20, wherein the display setting process comprises wirelessly communicating with the electronic device according to the first display setting information.

23. The operating method as claimed in claim 22, wherein a step of wirelessly communicating with the electronic device according to the first display setting information comprises: transmitting the first display setting information to the electronic device.

24. The operating method as claimed in claim 23, wherein the step of wirelessly communicating with the electronic device according to the first display setting information comprises:

receiving, from the electronic device, second display setting information associated with at least one of the one or more plurality of goods objects; and communicating with the at least one target electronic shelf according to the second display setting information.

25. The operating method as claimed in claim 24, wherein the second display setting information comprises position adjustment information associated with at least one of the plurality of goods objects.

26. The operating method as claimed in claim 23, further comprising performing a confirmation process for confirming whether the goods information of first display setting information associated with the plurality of goods objects is correct or not.

27. The operating method as claimed in claim 26, wherein the confirmation process comprises obtaining confirmation information from the electronic device.

28. The operating method as claimed in claim 26, further comprising performing a correction process for correcting the goods info illation of the first display setting information associated with the plurality of goods objects when the goods information of the first display setting information associated with the plurality of goods objects is not correct.

29. The operating method as claimed in claim 28, wherein the goods information of the first display setting information comprises candidate goods information associated with a plurality of candidate goods objects, and the correction process comprises:

transmitting the candidate goods information to the electronic device; and communicate with the electronic device to obtaining selection information indicating which of the candidate goods objects is correct.

30. The operating method as claimed in claim 28, wherein the correction process comprises:

communicating with the electronic device to obtain identification information of the plurality of goods objects, wherein the identification information is determined according to a captured image of the plurality of goods objects.

31. The operating method as claimed in claim 30, wherein the captured image of the plurality of goods objects comprises code information indicating the identification information of the plurality of goods objects.

32. The operating method as claimed in claim 20, further comprising receiving the feature information from the electronic device, wherein the feature information has been extracted by the electronic device.

33. The operating method as claimed in claim 20 further comprising:

receiving the image information from the electronic device; and performing an image processing on the image information to obtain the feature information of the plurality of goods objects.

34. The operating method as claimed in claim 33, wherein the step of performing the image processing on the at least one captured image to obtain the feature information of the plurality of goods objects comprising performing an artificial intelligence process.

35. The operating method as claimed in claim 19, wherein the identification information is determined according to a captured image comprising code information indicating identification information of the at least one target electronic shelf.

36. An operating method with goods information executable by an electronic device, comprising:

pairing the electronic device to at least one target electronic shelf among a plurality of electronic shelves registered to a network by communicating with the electronic device to obtain identification information of at least one target electronic shelf and searching the electronic shelves registered to the network for the at least one target electronic shelf according to the identification information of the at least one target electronic shelf;

activating an image capturing process to obtain a captured image of one or more a plurality of goods objects on the at least one target electronic shelf among the electronic shelves in the network;

extracting feature information from the captured image of the plurality of goods objects; and displaying first display setting information for setting display information to be displayed by the at least one target electronic shelf according to the feature information, wherein the first display setting information associated with the plurality of goods objects comprises recognition information dependent upon the feature information of the captured image, wherein an edging detection operation is performed on the image information of the plurality of goods objects to find out a plurality of feature points of a plurality of groups of the image information and a plurality of cutting lines is generated according to the feature points, wherein each of the feature points has a maximum value of corresponding group, wherein merely one display is provided to display a plurality of electronic shelf labels of the plurality of goods objects, and a position of each of a plurality of display regions is set according to each of the cutting lines, wherein each of the display regions is used display each of the electronic shelf labels of corresponding good.

37. The operating method as claimed in claim 36, wherein the first display setting information is obtained from a server of the network communicating with the electronic device.

38. The operating method as claimed in claim 37, wherein the communicating enables the server to set display information to be displayed by the at least one target electronic shelf according to the recognition information associated with the plurality of goods objects.

39. The operating method as claimed in claim 38, further comprising displaying message for requesting a user of the electronic device to confirm goods information of first display setting information associated with the plurality of goods objects is correct or not.

40. The operating method as claimed in claim 39, further comprising displaying message for requesting the user of the electronic device to correcting the goods information of the first display setting information associated with the plurality of goods objects when the goods information of the first display setting information associated with the plurality of goods objects is not correct.

41. The operation method of claim 36, further comprising displaying message for requesting a user of the electronic device to provide second display setting information for setting display information to be displayed by the at least one target electronic shelf.

42. The operating method as claimed in claim 41, wherein the second display setting information comprises position adjustment information associated with at least one of the plurality of goods objects.

43. A non-transitory computer readable medium, having stored thereon software instructions that when executed by a processor, cause the processor to execute to steps comprising:
pairing an electronic device to at least one target electronic shelf among a plurality of electronic shelves registered to a network by obtaining identification information of the at least one target electronic shelf according to a first captured image of the at least one target electronic shelf and communicating with a server according to the identification information of the at least one target electronic shelf to enable the server searches the electronic shelves registered to the network for the at least one target electronic shelf according to the identification information of the at least one target electronic shelf;
obtaining image information of a plurality of goods objects on at least one target electronic shelf among a plurality of electronic shelves in a network;
performing an edging detection operation on the image information of the plurality of goods objects to find out a plurality of feature points of a plurality of groups of the image information and generating a plurality of cutting lines according to the feature points, wherein each of the feature points has a maximum value of corresponding group; and
wirelessly communicating with a server for controlling the electronic shelves in the network according to either or both of the image information and feature information extracted from the image information of the plurality of goods objects, wherein the communicating comprises transmitting the feature information of the plurality of goods objects to the server,
wherein merely one display is provided to display a plurality of electronic shelf labels of the plurality of goods objects, and a position of each of a plurality of display regions is set according to each of the cutting lines, wherein each of the display regions is used display each of the electronic shelf labels of corresponding good.

44. The non-transitory computer readable medium as claimed in claim 43, wherein the communicating enables the server to set display information to be displayed by the at least one target electronic shelf according to the feature information of the plurality of goods objects.

45. The non-transitory computer readable medium as claimed in claim 43, wherein the communicating further comprises receiving first display setting information related to the feature information associated with the plurality of goods objects from the server.

46. The non-transitory computer readable medium as claimed in claim 43, further comprising transmitting the image information to the server without extracting the feature information.

47. The non-transitory computer readable medium as claimed in claim 43, further comprising:
performing an image processing on the at least one captured image to obtain the feature information of the plurality of goods objects; and
transmitting the feature information to the server.

48. A non-transitory computer readable medium, having stored thereon software instructions that when executed by a processor, cause the processor to execute to steps comprising:
pairing an electronic device to at least one target electronic shelf among the electronic shelves registered to a network by communicating with the electronic device to obtain identification information of at least one target electronic shelf and searching the electronic shelves registered to the network for the at least one target electronic shelf according to the identification information of the at least one target electronic shelf;
wirelessly receiving, from the electronic device, feature information of the goods objects on the at least one target electronic shelf among the electronic shelves, wherein the feature information is extracted from the image information;
obtaining recognition information according to the feature information of the plurality of goods objects; and
performing a display setting process for setting display information to be displayed by the at least one target electronic shelf according to the recognition information,
wherein an edging detection operation is performed on the image information of the plurality of goods objects to find out a plurality of feature points of a plurality of groups of the image information and a plurality of cutting lines is generated according to the feature points, wherein each of the feature points has a maximum value of corresponding group, wherein merely one display is provided to display a plurality of electronic shelf labels of the plurality of goods objects, and a position of each of a plurality of display regions is set according to each of the cutting lines, wherein each of the display regions is used display each of the electronic shelf labels of corresponding good.

49. The non-transitory computer readable medium as claimed in claim 48, wherein the display setting process comprises:

obtaining first display setting information according to the recognition information, and communicating with the at least one target electronic shelf according to the first display setting information.

50. The non-transitory computer readable medium as claimed in claim 48, further comprising receiving the feature information from the electronic device, wherein the feature information has been extracted by the electronic device.

51. The non-transitory computer readable medium as claimed in claim 48 further comprising:

receiving the image information from the electronic device; and performing an image processing on the image information to obtain the feature information of the plurality of goods objects.

52. The non-transitory computer readable medium as claimed in claim 51, wherein the step of performing the image processing on the at least one captured image to obtain the feature information of the plurality of goods objects comprising performing an artificial intelligence process.

* * * * *